United States Patent
Isago et al.

(10) Patent No.: US 9,068,078 B2
(45) Date of Patent: Jun. 30, 2015

(54) POLYPHENYLENE SULFIDE RESIN COMPOSITION, PRODUCTION METHOD THEREOF AND MOLDED PRODUCT THEREOF

(71) Applicant: TORAY INDUSTRIES, INC., Tokyo (JP)

(72) Inventors: Hiroyuki Isago, Nagoya (JP); Kei Saitoh, Nagoya (JP); Hideki Matsumoto, Nagoya (JP); Yoshiomi Horiguchi, Nagoya (JP); Atsushi Ishio, Nagoya (JP)

(73) Assignee: TORAY INDUSTRIES, INC., Tokyo (JP)

(*) Notice: Subject to any disclaimer, the term of this patent is extended or adjusted under 35 U.S.C. 154(b) by 0 days.

(21) Appl. No.: 14/347,529

(22) PCT Filed: Sep. 27, 2012

(86) PCT No.: PCT/JP2012/006174
§ 371 (c)(1),
(2) Date: Mar. 26, 2014

(87) PCT Pub. No.: WO2013/046682
PCT Pub. Date: Apr. 4, 2013

(65) Prior Publication Data
US 2014/0256864 A1    Sep. 11, 2014

(30) Foreign Application Priority Data

Sep. 30, 2011  (JP) .................. 2011-217024
Jun. 26, 2012  (JP) .................. 2012-142790

(51) Int. Cl.
*C08L 81/04* (2006.01)
*C08J 3/20* (2006.01)
(Continued)

(52) U.S. Cl.
CPC ............. *C08L 81/04* (2013.01); *C08J 3/203* (2013.01); *C08J 2381/02* (2013.01);
(Continued)

(58) Field of Classification Search
None
See application file for complete search history.

(56) References Cited

U.S. PATENT DOCUMENTS 4,098,762 A * 7/1978 Miyata et al. .................. 524/162
5,252,633 A * 10/1993 Ohara et al. .................. 523/210
(Continued)

FOREIGN PATENT DOCUMENTS

DE  4230680  *  3/1994  ............. C08L 81/02
EP  0278555  *  2/1988  ............. C08K 3/02
(Continued)

OTHER PUBLICATIONS

Technical data sheet for Nylon monofilamend from Today Monofilament Co., Ltd., 3 pages, 2006.*
(Continued)

*Primary Examiner* — Robert S Loewe
(74) *Attorney, Agent, or Firm* — Ratnerprestia

(57) ABSTRACT

There is provided a polyphenylene sulfide (PPS) resin composition, comprising: 5 to 50 parts by weight of a polyamide resin (b) and 50 to 250 parts by weight of a metal hydroxide (c) relative to 100 parts by weight of a polyphenylene sulfide resin (a), wherein the metal hydroxide is dispersed in the composition at an average secondary particle diameter equal to or less than 5 μm. The PPS resin composition may provide excellent tracking resistance without significantly damaging various intrinsic properties of a PPS resin, such as excellent mechanical strength and low gas generation.

14 Claims, 1 Drawing Sheet

(51) Int. Cl.
*B29B 7/48* (2006.01)
*B29B 7/84* (2006.01)
*B29C 47/60* (2006.01)
*B29K 81/00* (2006.01)
*B29B 9/16* (2006.01)

(52) U.S. Cl.
CPC ............ *C08J 2381/04* (2013.01); *B29B 7/482* (2013.01); *B29B 7/845* (2013.01); *B29K 2081/04* (2013.01); *B29B 2009/168* (2013.01); *B29C 47/6056* (2013.01); *B29C 47/6087* (2013.01)

(56) References Cited

U.S. PATENT DOCUMENTS

| | | | | |
|---|---|---|---|---|
| 5,422,092 | A * | 6/1995 | Miyata | 423/635 |
| 6,025,424 | A * | 2/2000 | Katsuki et al. | 524/436 |
| 6,310,130 | B1 * | 10/2001 | Dubois et al. | 524/436 |
| 7,384,690 | B2 * | 6/2008 | Machida et al. | 428/328 |
| 2007/0021549 | A1 | 1/2007 | Kojima et al. | |
| 2007/0265375 | A1 | 11/2007 | Ishio et al. | |
| 2009/0306309 | A1 * | 12/2009 | Ishio et al. | 525/519 |
| 2009/0314514 | A1 * | 12/2009 | Galletti et al. | 174/110 A |
| 2010/0249342 | A1 * | 9/2010 | Unohara et al. | 525/535 |
| 2011/0257313 | A1 * | 10/2011 | Seki | 524/126 |

FOREIGN PATENT DOCUMENTS

| | | | |
|---|---|---|---|
| EP | 2410021 A1 | 1/2012 | |
| JP | 5-271542 A | 10/1993 | |
| JP | 8-291253 A | 11/1996 | |
| JP | 10-279801 A | 10/1998 | |
| JP | 10-298430 A | 11/1998 | |
| JP | 2001-288363 A | 10/2001 | |
| JP | 2005-15792 | 1/2005 | |
| JP | 2008-13617 A | 1/2008 | |
| JP | 2008-231249 A | 10/2008 | |
| JP | 2008-291248 A | 12/2008 | |
| JP | 2011063015 A | 3/2011 | |
| WO | WO 0157138 * | 8/2001 | ............ C08L 81/02 |
| WO | WO 2006/030577 A1 | 3/2006 | |
| WO | WO 2010/107022 A1 | 3/2010 | |

OTHER PUBLICATIONS

International Search Report for PCT/JP2012/006174, by the Japanese Patent Office Issued Dec. 11, 2012.

Rothon, R N et al., "Flame Retardant Effects of Magnesium Hydroxide," Polymer Degradation and Stability, vol. 54, No. 2/03, Jan. 1, 1996, pp. 383-385.

Extended European Search Report for EP 12836972.5-1706 mailed Feb. 2, 2015.

* cited by examiner

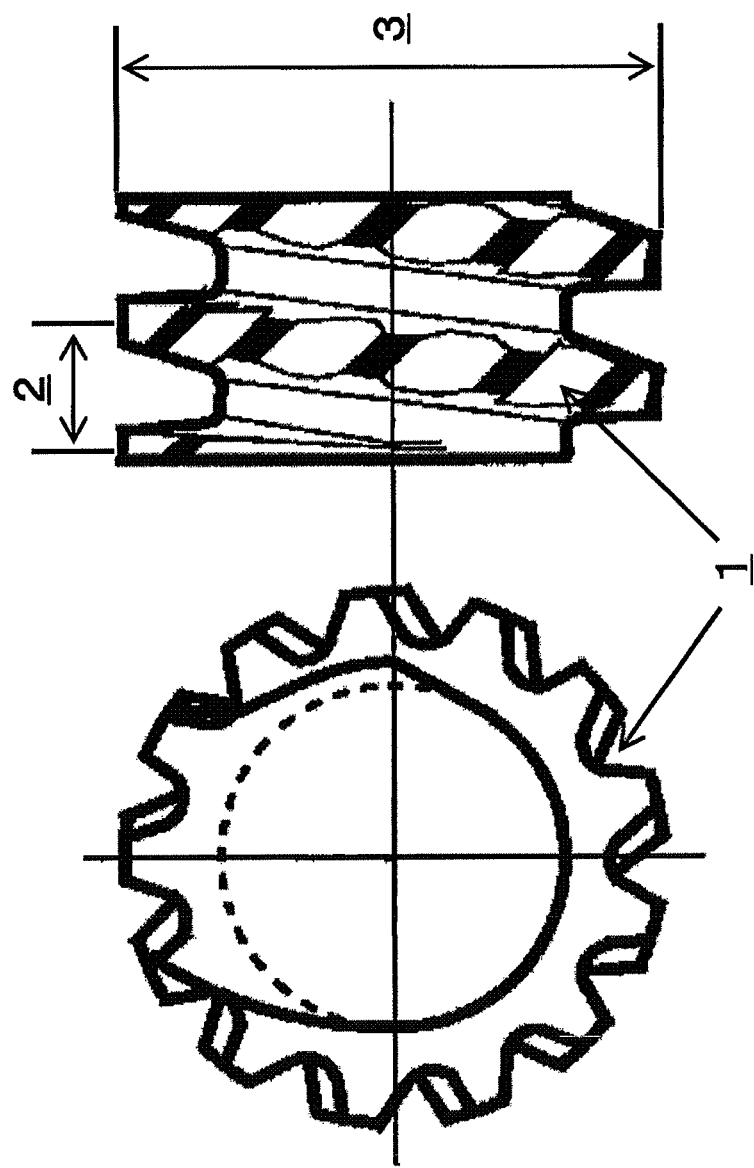

POLYPHENYLENE SULFIDE RESIN COMPOSITION, PRODUCTION METHOD THEREOF AND MOLDED PRODUCT THEREOF

CROSS REFERENCE TO RELATED APPLICATIONS

This is the U.S. National Phase application of PCT International Application No. PCT/JP2012/006174, filed Sep. 27, 2012, and claims priority to Japanese Patent Application No. 2012-142790, filed Jun. 26, 2012 and Japanese Patent Application No. 2011-217024, filed Sep. 30, 2011, the disclosures of each of which applications being incorporated herein by reference in their entireties for all purposes.

FIELD OF THE INVENTION

The present invention relates to a polyphenylene sulfide resin composition having excellent tracking resistance, gas generation rate and mechanical properties, as well as a production method thereof and a molded product thereof and is specifically effectively applied to electric component applications such as electric and electronic components and automobile electrical components and is also applied to a wide variety of fields.

BACKGROUND OF THE INVENTION

The polyphenylene sulfide (hereinafter abbreviated as "PPS") resin is an engineering plastic having excellent heat resistance, flame resistance, chemical resistance, electrical insulation property, moist heat resistance, as well as mechanical strength and dimensional stability. The PPS resin can be molded to various molded products, fibers and films by various molding methods including injection molding and extrusion molding and is practically used in a wide range of fields such as electric and electronic components, mechanical components and automobile components.

The PPS resin, however, has the poorer resistance to tracking breakdown occurring under application of a high voltage to the insulator surface, compared with other engineering plastics such as polyamide resins and polyester resins.

Accordingly, irrespective of the good heat resistance, flame resistance, chemical resistance, electrical insulation property, most heat resistance as well as mechanical strength and dimensional stability of the PPS resin described above, the application of the PPS resin is limited in an environment exposed to a relatively high voltage. It has thus been demanded to improve the tracking resistance of the PPS resin composition.

Some approaches have been proposed to improve the tracking resistance of the PPS resin: one proposed application adds magnesium hydroxide, another polymer and an additive to the PPS resin, in order to improve the tracking resistance.

For example, Patent Document 1 is an application that adds magnesium hydroxide and a polyamide resin to the PPS resin, in order to improve the tracking resistance. Patent Document 2 is an application that describes a composition produced by adding magnesium hydroxide, a polyolefin polymer and/or polyolefin copolymer, silicone and a fluororesin to the PPS resin. Patent Document 3 is an application that describes a composition produced by adding magnesium hydroxide and carnauba wax and/or amide carboxylate wax. Patent Document 4 is an application that describes a PPS resin composition using magnesium hydroxide having a specific primary particle diameter to improve the tracking resistance.

In the resin compositions proposed by the above patent documents, however, a high content of magnesium hydroxide is essential for the sufficiently good tracking resistance. The high content, however, disadvantageously leads to significant deterioration of the mechanical strength of the PPS resin composition. These patent documents describe the primary particle diameter of magnesium hydroxide to be contained, but fail to describe the dispersion state of magnesium hydroxide in the composition or in the molded product. These patent documents also fail to describe the kneading method taking into account the dispersion state. In the general melt kneading method, magnesium hydroxide is likely to cause secondary aggregation of magnesium hydroxide. The secondary aggregation disadvantageously leads to deterioration of the mechanical strength. In Patent Document 1, a specific type of polyamide resin is added to the PPS resin. This polyamide, however, has poor heat resistance at the melt processing temperature of the PPS resin and accordingly causes deterioration of the physical properties of the resulting composition.

Patent Document 5 is an application that describes a resin composition produced by adding a large amount of a polyamide to a polyarylene sulfide (hereinafter abbreviated as "PAS") resin as the method of improving the racking resistance of the PPS resin without using magnesium hydroxide. In Examples of this application, 80 parts or more of the polyamide resin are added to 100 parts of the PPS resin. Such addition of a polyamide having a high melting point maintains the heat resistance, but deteriorates the intrinsic low gas generation, flame resistance, dimensional stability and low water absorption of the PPS resin.

Patent Document 6 is an application that describes a composition having the improved dispersion state of a polyamide resin in the PPS resin. Decreasing the dispersed particle diameter of the amide resin has the excellent effect on improvement of the toughness. The composition of the polyamide in Patent Document 6, however, cannot provide the PPS resin composition having the high tracking resistance.

PATENT DOCUMENTS

Patent Document 1: JP H05-271542A
Patent Document 2: JP H08-291253A
Patent Document 3: JP 2008-13617A
Patent Document 4: JP 2001-288363A
Patent Document 5: JP H10-279801A
Patent Document 6: WO 2006-30577A

SUMMARY OF THE INVENTION

The "tracking breakdown" means that a tracking carbon path is formed to make flow of short circuit current under application of a voltage of a damaged insulator surface. Formation of a tracking carbon path under application of a high voltage of about 600 V is triggered by partial degradation on the surface and leads to abrupt formation of an electrically conducting path. A resin composition unlikely to have tracking breakdown has accordingly been demanded.

The object of the invention is accordingly to provide a PPS resin composition having excellent tracking resistance without significantly damaging various intrinsic properties of a PPS resin, such as excellent mechanical strength and low gas generation.

As a result of extensive study to solve this problem, the invention provides a PPS resin composition containing a PPS resin, a polyamide resin and a metal hydroxide in a specified composition to have excellent tracking resistance, mechanical strength and low gas generation by improving the dispersion state of the metal hydroxide in this composition.

The present invention is accordingly made to solve at least part of the problems described above and may be implemented by the following aspects.

(1) There is provided a polyphenylene sulfide resin composition, comprising: 5 to 50 parts by weight of a polyamide resin (b) and 50 to 250 parts by weight of a metal hydroxide (c) relative to 100 parts by weight of a polyphenylene sulfide resin (a), wherein the metal hydroxide is dispersed in the composition at an average secondary particle diameter equal to or less than 5 µm.

(2) There is provided the polyphenylene sulfide resin composition described in (1), wherein the polyamide resin is dispersed in the composition at a number-average dispersed particle diameter less than 1 µm.

(3) There is provided the polyphenylene sulfide resin composition described in either (1) or (2), wherein the polyamide resin has a water absorption rate equal to or less than 0.5% by weight at 23° C. under water immersion after elapse of 24 hours and has a heating loss equal to or less than 2.5% by weight at 320° C. in the air for 2 hours.

(4) There is provided the polyphenylene sulfide resin composition described in any one of (1) to (3), wherein the polyamide resin includes a plant-derived component.

(5) There is provided the polyphenylene sulfide resin composition described in any one of (1) to (4), wherein the polyamide resin is an aliphatic polyamide resin having an amide group concentration greater than 6.

(6) There is provided the polyphenylene sulfide resin composition described in (5), wherein the polyamide resin is one or more polyamide resins selected from the group consisting of nylon 610, nylon 612, nylon 11 and nylon 12.

(7) There is provided the polyphenylene sulfide resin composition described in any one of (1) to (4), wherein the polyamide resin is a semi-aromatic polyamide resin having an amide group concentration greater than 7.

(8) There is provided the polyphenylene sulfide resin composition described in (7), wherein the polyamide resin is one or more polyamide resins selected from the group consisting of nylon 9T and nylon 10T.

(9) There is provided the polyphenylene sulfide resin composition described in any one of (1) to (8), wherein the polyphenylene sulfide resin has an ash content equal to or less than 0.3% by weight and an amount of volatile component equal to or less than 0.8% by weight when the polyphenylene sulfide resin is heated and melted at 320° C. under vacuum for 120 minutes.

(10) There is provided the polyphenylene sulfide resin composition described in any one of (1) to (9), wherein the metal hydroxide is the metal hydroxide surface treated with either an aliphatic organic compound or an organosilane compound.

(11) There is provided A production method of the of the polyphenylene sulfide resin composition described in any one of (1) to (10), the production method comprising: performing melt kneading at a peripheral rate of 15 to 50 m/minute with a twin screw extruder having a screw arrangement including two or more kneading sections.

(12) There is provided the production method of the polyphenylene sulfide resin composition described in (11), wherein in the melt kneading, a resin temperature of the polyphenylene sulfide resin composition at a discharge outlet is equal to or lower than 350° C., and a temperature difference between the resin temperature and a cylinder temperature of the twin screw extruder is 0° C. to 50° C.

(13) There is provided the production method of the polyphenylene sulfide resin composition described in either (11) or (12), wherein the melt kneading uses a screw arrangement including a mixing screw element having notches.

(14) There is provided a molded product obtained by injection molding the polyphenylene sulfide resin composition described in any one of (1) to (10).

(15) There is provided the molded product described in (14), the molded product being an electric equipment component.

The present invention provides a polyphenylene sulfide resin composition having excellent tracking resistance, mechanical strength and low gas generation.

BRIEF DESCRIPTION OF THE DRAWINGS

FIG. 1 is a diagram illustrating mixing screw element having notches.

DETAILED DESCRIPTION OF THE INVENTION

The following describes embodiments of the invention in detail.

(1) (a) Polyphenylene Sulfide Resin

The PPS resin used according to an embodiment of the invention is a polymer having a repeating unit shown by the following structural formula:

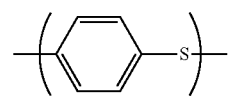

[Chem. 1]

In terms of the heat resistance, the PPS resin is preferably a polymer having 70 mol % or more or further specifically having 90 mol % or more of the repeating unit shown by the above structural formula. The PPS resin may also be configured, such that less than about 30 mol % of its repeating unit is comprised of, for example, repeating units having the following structures:

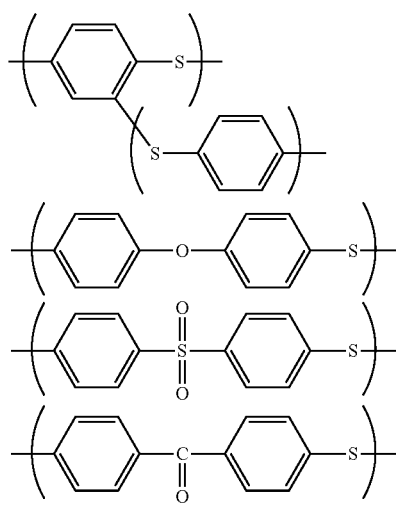

[Chem. 2]

-continued

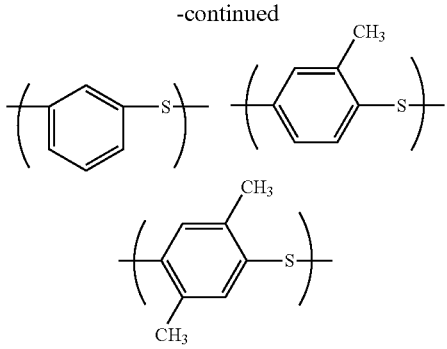

A PPS copolymer partly including these structures has a low melting point, so that a resin composition of this PPS copolymer is likely to have an advantage in moldability.

The melt viscosity of the PPS resin used according to the embodiment of the invention is not specifically limited, but in terms of flowability in the process of melt kneading or molding, suppression of degradation of a metal hydroxide in the process of melt kneading and dispersion control, is preferably not higher than 200 Pa·s (300° C., shear rate: 1216/s), is more preferably not higher than 100 Pa·s, is furthermore preferably not higher than 70 Pa·s, and is especially preferably not higher than 50 Pa·s. In general, a high molecular compound tends to decrease the viscosity with a decrease in molecular weight. In terms of reduction of toughness associated with reduction in molecular weight, the lower limit of the melt viscosity is preferably not lower than 1 Pa·s and is more preferably not lower than 5 Pa·s. When a PPS resin having the melt viscosity above 200 Pa·s is used and is melt kneaded with a metal hydroxide and other fillers, on the other hand, significant shear heat is generated to cause degradation of the metal hydroxide and a polyamide resin. Accordingly, such PPS resin is not preferable. Using the PPS resin having the melt viscosity above 200 Pa·s increases the average secondary particle diameter of the metal hydroxide in the composition, although its reason is not clear. As a result, the PPS resin having the melt viscosity above 200 Pa·s has the poor tracking resistance and mechanical strength. A measurement method using CAPILOGRAPH manufactured by Toyo Seiki Seisaku-sho, Ltd. may be employed for the method of measuring the melt viscosity.

In terms of improving the tracking resistance, the ash content of the PPS resin used according to the embodiment of the invention is preferably not greater than 0.3% by weight, is more preferably not greater than 0.2% by weight and is furthermore preferably not greater than 0.1% by weight. It is thought that the presence of a metal-containing substance measured as the ash content makes a contribution to tracking under application of a voltage, although its mechanism is not clear.

The ash content is measured by the following method. The method weighs 5 g of PPS base powder in the dry state in a crucible and fires the PPS resin to obtain black bulk substance on an electric heater. The method subsequently continues firing the substance in an electric oven set to 550° C. until the carbide is burned out. The method then cools down the substance in a desiccator, measures the weight and calculates the ash content based on comparison from the initial weight.

In terms of satisfying the high tracking resistance, low gas generation and high strength, the amount of volatile components when the PPS resin used according to the embodiment of the invention is heated and melted at 320° C. under vacuum for 120 minutes is preferably not greater than 0.8% by weight, is more preferably not greater than 0.6% by weight and is furthermore preferably not greater than 0.4% by weight. The amount of volatile components includes degradation products of the PPS resin and the low molecular-weight substances. It is thought that these components accelerate formation of a tracking carbon path during a tracking resistance test and interfere with the high strength of the PPS resin.

The "amount of volatile components" herein means the amount of adhesive components liquefied or solidified by cooling the components volatilized when the PPS resin is heated and melted under vacuum. The amount of volatile components is measured by heating a glass vial where the PPS resin is vacuum sealed in a tube furnace. The glass vial includes a body portion of 100 mm×25 mm and a neck portion of 255 mm×12 mm and has the wall thickness of 1 mm. A specific measurement method inserts only the body portion of the glass vial where the PPS resin is vacuum sealed in a tube furnace at 320° C. and heats the body portion for 120 minutes. The volatile gas is then cooled and adheres to the neck portion of the vial which is not heated in the tube furnace. The method cuts out and weighs this neck portion and subsequently dissolves the adhesive volatile components in chloroform for removal. The method subsequently dries and re-weighs the neck portion. The method then determines the weight difference of the neck portion of the vial before and after removal of the volatile components, so as to calculate the amount of volatile components as the percentage relative to the weight of the PPS resin used for the measurement.

The following describes a production method of the PPS resin used according to the embodiment of the invention, but the following method is not at all restrictive and may be replaced by any other method that can produce the PPS resin having the above structure.

First, the following describes the details of a polyhalogenated aromatic compound, a sulfidizing agent, a polymerization solvent, a molecular weight modifier, a polymerization modifier and a polymerization stabilizer used in the production method.

[Polyhalogenated Aromatic Compound]

The "polyhalogenated aromatic compound" is a compound having two or more halogen atoms in one molecule. Specific examples of the polyhalogenated aromatic compound include p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5,-dichloro-p-xylene, 1,4-dibromobenzene, 1,4-diiodobenzene and 1-methoxy-2,5-dichlorobenzene, and p-dichlorobenzene is used preferably. Additionally, two or different polyhalogenated aromatic compounds may be used in combination to form a copolymer. This copolymer preferably has a p-dihalogenated aromatic compound as the major component.

In terms of obtaining the PPS resin having the viscosity suitable for processing, the lower limit of the used amount of the polyhalogenated aromatic compound is, for example, not less than 0.9 mol, is preferably not less than 0.95 mol and is more preferably not less than 1.005 mol per 1 mol of the sulfidizing agent. The upper limit is, for example, not greater than 2.0 mol, is preferably not greater than 1.5 mol and is more preferably not greater than 1.2 mol per 1 mole of the sulfidizing agent.

[Sulfidizing Agent]

The sulfidizing agent may be, for example, an alkali metal sulfide, an alkali metal hydrosulfide or hydrogen sulfide.

Specific examples of the alkali metal sulfide include lithium sulfide, sodium sulfide, potassium sulfide, rubidium sulfide, cesium sulfide and mixtures of two or more compounds selected among these alkali metal sulfides. Among them, sodium sulfide is preferably used. Any of these alkali metal sulfides may be used as a hydrate or an aqueous mixture or in the form of an anhydride.

Specific examples of the alkali metal hydrosulfide include sodium hydrosulfide, potassium hydrosulfide, lithium hydrosulfide, rubidium hydrosulfide, cesium hydrosulfide and mixtures of two or more compounds selected among these alkali metal hydrosulfides. Among them, sodium hydrosulfide is preferably used. Any of these alkali metal hydrosulfides may be used as a hydrate or an aqueous mixture or in the form of an anhydride.

The alkali metal sulfide used may be produced in situ in the reaction system from an alkali metal hydrosulfide and an alkali metal hydroxide. Additionally, the alkali metal sulfide may be produced from an alkali metal hydrosulfide and an alkali metal hydroxide and may be transferred to a polymerization tank to be used.

Alternatively the alkali metal sulfide used may be produced in situ in the reaction system from an alkali metal hydroxide such as lithium hydroxide or sodium hydroxide and hydrogen sulfide. Additionally, the alkali metal sulfide may be produced from an alkali metal hydroxide such as lithium hydroxide or sodium hydroxide and hydrogen sulfide and may be transferred to a polymerization tank to be used.

When there is a partial loss of the sulfidizing agent due to, for example, a dehydration operation prior to a start of polymerization reaction, the amount of the "fed" sulfidizing agent indicates a remaining amount of the sulfidizing agent determined by subtracting the loss from an actual fed amount.

Besides, an alkali metal hydroxide and/or an alkaline earth hydroxide may be used together with the sulfidizing agent. Preferable examples of the alkali metal hydroxide specifically include sodium hydroxide, potassium hydroxide, lithium hydroxide, rubidium hydroxide, cesium hydroxide and mixtures of two or more components selected among these alkali metal hydroxides. Specific examples of the alkaline earth hydroxide include calcium hydroxide, strontium hydroxide and barium hydroxide. Among them, sodium hydroxide is preferably used.

When the alkali metal hydrosulfide is used as the sulfidizing agent, it is especially preferable to use an alkali metal hydroxide simultaneously. The lower limit of the used amount of the alkali metal hydroxide is, for example, not less than 0.95 mol, is preferably not less than 1.00 mol and is more preferably not less than 1.005 mol per 1 mol of the alkali metal hydrosulfide. The upper limit is, for example, not greater than 1.2 mol, is preferably not greater than 1.15 mol and is more preferably not greater than 1.100 mol.

[Polymerization Solvent]

An organic polar solvent is preferably used as the polymerization solvent. Specific examples include: N-alkyl pyrrolidones such as N-methyl-2-pyrrolidone and N-ethyl-2-pyrrolidone, caprolactams such as N-methyl-ε-caprolactam; aprotic organic solvents such as 1,3,-dimethyl-2-imidazolidinone, N,N-dimethylacetamide, N,N-dimethylformamide, hexamethylphosphoric triamide, dimethyl sulfone and tetramethylene sulfoxide; and mixtures thereof. Any of these polymerization solvents has the high reaction stability and is thus used preferably. Among them, N-methyl-2-pyrrolidone (hereinafter may be abbreviated as NMP) is especially preferably used.

The lower limit of the used amount of the organic polar solvent is, for example, not less than 2.0 mol, is preferably not less than 2.25 mol and is more preferably not less than 2.5 mol per 1 mol of the sulfidizing agent. The upper limit is, for example, not greater than 10 mol, is preferably not greater than 6.0 mol and is more preferably not greater than 5.5 mol.

[Molecular Weight Modifier]

For the purpose of, for example, forming terminals of the resulting PPS resin, controlling the polymerization reaction or modifying the molecular weight, a monohalogenated compound (not necessarily aromatic compound) may be used together with the polyhalogenated aromatic compound described above.

[Polymerization Modifier]

One preferable aspect uses a polymerization modifier, in order to obtain a PPS resin having a relatively high degree of polymerization in a shorter time. The "polymerization modifier" herein means a substance having the function of increasing the viscosity of the resulting PPS resin. Specific examples of this polymerization modifier include organic carboxylates, water, alkali metal chlorides, organic sulfonates, alkali metal sulfates, alkaline earth metal oxides, alkali metal phosphates and alkaline earth metal phosphates. Any of these polymerization modifiers may be used alone, or alternatively two or more of these polymerization modifiers may be used simultaneously. Among them, organic carboxylates, water and alkali metal chlorides are preferable. More specifically, alkali metal carboxylates are preferable as the organic carboxylate, and lithium chloride is preferable as the alkali metal chloride.

The above alkali metal carboxylate is a compound expressed by a general formula $R(COOM)_n$ (in the formula, R represents an alkyl group, a cycloalkyl group, an aryl group, an alkyl aryl group or an aryl alkyl group; M represents an alkali metal selected among lithium, sodium, potassium, rubidium and cesium; and n represents an integral number of 1 to 3). The alkali metal carboxylate may be used as a hydrate, an anhydride or an aqueous solution. Specific examples of the alkali metal carboxylate include lithium acetate, sodium acetate, potassium acetate, sodium propionate, lithium valerate, sodium benzoate, sodium phenylacetate, potassium p-toluate and mixtures thereof.

The alkali metal carboxylate may be obtained by mixing and reacting substantially the same chemical equivalents of an organic acid and one or more compound selected among the group consisting of alkali metal hydroxides, alkali metal carbonates and alkali metal bicarbonates. Among the above alkali metal carboxylates, the lithium salts have high solubility in the reaction system and significant modifier effects but are expensive. The potassium salts, rubidium salts and cesium salts are, on the other hand, likely to have insufficient solubility in the reaction system. Accordingly, most preferably used is sodium acetate that is inexpensive and has moderate solubility in the polymerization system.

The lower limit of the used amount of any of these alkali metal carboxylates used as the polymerization modifier is, for example, not less than 0.01 mol, is preferably not less than 0.1 mol to achieve the higher degree of polymerization, and is more preferably not less than 0.2 mol per 1 mol of the fed alkali metal sulfide. The upper limit is, for example, not greater than 2 mol, is preferably not greater than 0.6 mol to achieve the higher degree of polymerization, and is more preferably not greater than 0.5 mol.

The lower limit of the added amount of water used as the polymerization modifier is, for example, not less than 0.3 mol, is preferably not less than 0.6 to achieve the higher degree of polymerization, and is more preferably not less than 1 mol per 1 mol of the fed alkali metal sulfide. The upper limit is, for example, not greater than 15 mol, is preferably not greater than 10 mol to achieve the higher degree of polymerization, and is more preferably not greater than 5 mol.

It is also allowed as a matter of course to use two or more of these polymerization modifiers in combination. For example, using an alkali metal carboxylate and water together enables a PPS resin having a high degree of polymerization to be produced by the smaller required amounts of the alkali metal carboxylate and water.

The timing of addition of any of these polymerization modifiers is not specifically determined but may be any time during a pre-processing step described later, at the start of polymerization or in the middle of polymerization, and the polymerization modifier may be added in a plurality of additions. When an alkali metal carboxylate is used as the polymerization modifier, it is preferable to add the alkali metal carboxylate at once with the other additives at the start of the pre-processing step or at the start of polymerization in light of easy addition. When water is used as the polymerization modifier, on the other hand, it is effective to add water in the middle of the polymerization reaction after feeding the polyhalogenated aromatic compound.

[Polymerization Stabilizer]

A polymerization stabilizer may be used, in order to stabilize the polymerization reaction system and prevent a side reaction. The polymerization stabilizer contributes to stabilizing the polymerization reaction system and suppresses an undesired side reaction. One indication of the side reaction is generation of thiophenol. Addition of the polymerization stabilizer suppresses generation of thiophenol. Specific examples of the polymerization stabilizer are compounds such as alkali metal hydroxides, alkali metal carbonates, alkaline earth metal hydroxides and alkaline earth metal carbonates. Among them, alkali metal hydroxides such as sodium hydroxide, potassium hydroxide and lithium hydroxide are preferable. The alkali metal carboxylate described above also acts as the polymerization stabilizer and is thus included in one of the polymerization stabilizers. When the alkali metal hydrosulfide is used as the sulfidizing agent, it is especially preferable to use an alkali metal hydroxide simultaneously as described above. In this application, an excess of the alkali metal hydroxide relative to the sulfidizing agent may also serve as the polymerization stabilizer.

Any of these polymerization stabilizers may be used alone, or alternatively two or more of these polymerization stabilizers may be used in combination. The lower limit of the amount of the polymerization stabilizer is, for example, not less than 0.02 mol, is preferably not less than 0.03 mol and is more preferably not less than 0.04 mol per 1 mol of the fed alkali metal sulfide. The upper limit is, for example, not greater than 0.2 mol, is preferably not greater than 0.1 mol and is more preferably not greater than 0.09 mol. The excessively small rate has insufficient stabilization effects, while the excessively large rate is economically disadvantageous and is likely to reduce the polymer yield.

The timing of addition of the polymerization stabilizer is not specifically determined but may be any time during the pre-processing step described later, at the start of polymerization or in the middle of polymerization, and the polymerization stabilizer may be added in a plurality of additions. It is, however, preferable to add the polymerization stabilizer at once at the start of the pre-processing step or at the start of polymerization, in light of easy addition.

The following specifically and sequentially describes a pre-processing step, a polymerization reaction step, a recovery step and a post-processing step with respect to a preferable production method of the PPS resin used according to the embodiment of the invention. This method is, however, not restrictive at all.

[Pre-Processing Step]

In the production method of the PPS resin, the sulfidizing agent is generally used in the form of a hydrate. It is here preferable to raise the temperature of a mixture including an organic polar solvent and a sulfidizing agent and remove an excess amount of water out of the system, prior to addition of a polyhalogenated aromatic compound.

As described above, the sulfidizing agent used may be produced in situ in the reaction system from an alkali metal hydrosulfide and an alkali metal hydroxide or may be produced in a different tank from a polymerization tank. The method of such production is not specifically limited. One applicable method may add an alkali metal hydrosulfide and an alkali metal hydroxide to an organic polar solvent preferably under an inert gas atmosphere in a temperature range of ordinary temperature to 150° C. or preferably in a temperature range of ordinary temperature to 100° C. and raise the temperature of the mixture to at least 150° C. or higher or preferably to 180 to 260° C. under ordinary pressure or under reduced pressure, so as to remove water. The polymerization modifier may be added at this stage. The reaction may be made by addition of toluene, in order to facilitate removal of water.

The water content in the polymerization system during the polymerization reaction is preferably 0.3 to 10.0 mol per 1 mol of the fed sulfidizing agent. The "water content in the polymerization system" herein is an amount determined by subtracting the amount of water removed out of the polymerization system from the amount of water fed to the polymerization system. The water fed may be in any form, such as water, an aqueous solution or water of crystallization.

[Polymerization Reaction Step]

A PPS resin is produced by reaction of the sulfidizing agent and the polyhalogenated aromatic compound in the organic polar solvent in a temperature range of not lower than 200° C. but lower than 290° C.

The polymerization reaction step may start by mixing the sulfidizing agent and the polyhalogenated aromatic compound with the organic polar solvent preferably under an inert gas atmosphere at ordinary temperature or higher or preferably 100° C. or higher as the lower limit and at temperature of not higher than 240° C. or preferably not higher than 230° C. as the upper limit. At this stage, the polymerization modifier may be added. The order of feeding these raw materials may be in random order or may be simultaneously.

The step then raises the temperature of this mixture generally to a range of 200° C. to 290° C. The rate of temperature rise is not specifically limited; but it is generally select the rate of not lower than 0.01° C./minute and more preferably the range of not lower than 0.1° C. minute as the lower limit and it is generally select the rate of not higher than 5° C./minute and more preferably the range of not higher than 3° C./minute as the upper limit.

In general, the step finally raises the temperature of the mixture to 250 to 290° C. and keeps the mixture at the temperature generally for 0.25 hours or more or preferably for 0.5 hours or more as the lower limit and for 50 hours or less or preferably for 20 hours or less as the upper limit.

A method of raising the temperature to 270 to 290° C. after the reaction for a predetermined time at, for example, 200 to 260° C. at the stage prior to reaching to the final temperature is effective to achieve the higher degree of polymerization. In this application, generally the range of 0.25 hours to 20 hours or preferably the range of 0.25 to 10 hours is selected as the reaction time at 200 to 260° C.

Additionally, in some cases, multi-stage polymerization may be effective to obtain a polymer having the higher degree of polymerization. The multi-stage polymerization is effective at the time when the conversion ratio of the polyhalogenated aromatic compound in the system at 245° C. reaches 40 mol % or higher or preferably 60 mol %.

The conversion ratio of the polyhalogenated aromatic compound (abbreviated as PHA herein) is a value calculated by the following equations. The remaining amount of PHA is generally determined by gas chromatography.

(A) In the case of addition of an excess in molar ratio of the polyhalogenated aromatic compound relative to the alkali metal sulfide:

Conversion ratio=[feeding amount of PHA (mol)−remaining amount of PHA (mol)]/[feeding amount of PHA (mol)−excessive amount of PHA (mol)]

(B) In the case other than the above case (A):

Conversion ratio=[feeding amount of PHA (mol)−remaining amount of PHA (mol)]/[feeding amount of PHA (mol)]

[Recovery Step]

In the production method of the PPS resin, a solid substance is recovered from a polymerization reactant including a polymer and the solvent after the end of polymerization. Any of known recovery techniques may be employed as the method of recovery.

For example, an available method may slowly cool down the polymerization reactant after the end of the polymerization reaction for recovery of a particulate polymer. The slow cooling rate is not specifically limited but is generally 0.1° C./minute to 3° C./minute. There is no need to slowly cool down the polymerization reactant at a constant speed over the entire slow cooling step. For example, an applicable method may slowly cool down the polymerization reactant at the rate of 0.1 to 1° C./minute until crystallization and deposition of the polymer particles and then slowly cool down the polymerization reactant at the rate of not lower than 1° C./minute.

One of the preferable methods performs the recovery described above under an abrupt cooling condition. A flushing method is one preferable technique employed for this recovery method. The "flushing method" flushes the polymerization reactant from the state of high temperature and high pressure (generally not lower than 250° C. and not less than 8 kg/cm$^2$) into an atmosphere of ordinary pressure or reduced pressure and thereby recovers the polymer in the powdery form simultaneously with recovery of the solvent. "Flushing" herein means ejecting the polymerization reactant from a nozzle. More specifically, the atmosphere into which the polymerization reactant is flushed is, for example, nitrogen or steam in ordinary pressure, and the range of 150° C. to 250° C. is generally selected as the flushing temperature.

[Post-Processing Step]

The PPS resin may be subjected to acid treatment, hot water treatment or washing with an organic solvent, after production through the polymerization step and the recovery step described above.

The acid treatment may be performed as described below. The acid used for the acid treatment of the PPS resin is not specifically limited but may be any acid without the action of degrading the PPS resin. Available examples of the acid include acetic acid, hydrochloric acid, sulfuric acid, phosphoric acid, silicic acid, carbonic acid and propionic acid. Among them, acetic acid and hydrochloric acid are more preferably used. An acid that degrades and deteriorates the PPS resin, such as nitric acid is, on the other hand, unfavorable.

An available method of acid treatment is, for example, a method of soaking the PPS resin in an acid or an acid aqueous solution, with adequately stirring or heating as needed basis. For example, when acetic acid is used, sufficient effect is achieved by soaking the PPS resin powder in an acetic acid aqueous solution of pH 4 heated to 80 to 200° C. and stirring the resin-soaked solution for 30 minutes. The pH after the acid treatment may be 4 or higher, for example, about pH 4 to 8. The PPS resin subjected to the acid treatment is preferably washed with water or hot water several times for removal of the remaining acid or salt. The water used for washing is preferably distilled water or ion exchanged water, since distilled water and ion exchanged water do not deteriorate the effect of desired chemical modification of the PPS resin by the acid treatment.

The hot water treatment may be performed as described below. In the process of hot water treatment of the PPS resin, the temperature of hot water is not lower than 100° C., is more preferably not lower than 120° C., is furthermore preferably not lower than 150° C. and is especially preferably not lower than 170° C. The temperature of lower than 100° C. gives little effect of desired chemical modification of the PPS resin and is thus unfavorable.

In order to achieve the effect of desired chemical modification of the PPS resin by the hot water washing, the water used is preferably distilled water or ion exchanged water. The operation of the hot water treatment is not specifically limited. For example, a method of heating a predetermined amount of the PPS resin in a predetermined amount of water with stirring in a pressure vessel or a method of continuously performing hot water treatment may be employed as the method of hot water treatment. As the ratio of the PPS resin to water, the greater portion of water is preferable. The liquor ratio (the ratio of the weight of cleaning liquid to the dry weight of PPS) of not greater than 200 g of the PPS resin to 1 liter of water is, however, generally selected.

Degradation of terminal groups is unfavorable, so that a desired method employs an inert atmosphere as the atmosphere for processing, in order to avoid such degradation. Additionally, it is preferable to wash the PPS resin subjected to this hot water treatment operation, with hot water several times for removal of the remaining components.

The organic solvent washing may be performed as described below. The organic solvent used for washing the PPS resin is not specifically limited but may be any organic solvent without the action of degrading the PPS resin. Available examples of the organic solvent used for washing the PPS resin include: nitrogen-containing polar solvents such as N-methyl-2-pyrrolidone, dimethylformamide, dimethylacetamide, 1,3-dimethylimidazolidinone, hexamethylphosphoramide and piperazinones; sulfoxide/sulfone solvents such as dimethyl sulfoxide, dimethyl sulfone and sulfolane; ketone solvents such as acetone, methyl ethyl ketone, diethyl ketone and acetophenone; ether solvents such as dimethyl ether, dipropyl ether, dioxane and tetrahydrofuran; halogen solvents such as chloroform, methylene chloride, trichloroethylene, ethylene dichloride, perchloroethylene, monochloroethane, dichloroethane, tetrachloroethane, perchloroethane and chlorobenzene; alcohol/phenol solvents such as methanol, ethanol, propanol, butanol, pentanol, ethylene glycol, propylene glycol, phenol, cresol, polyethylene glycol and polypropylene glycol; and aromatic hydrocarbon solvents such as benzene, toluene and xylene. Among these organic solvents, it is especially preferable to use, for example, N-methyl-2-pyrrolidone, acetone, dimethylformamide and chloroform. Additionally, any of these organic solvents may be used alone or alternatively may be used as a mixture of two or more of the organic solvents.

An available method of the organic solvent washing is, for example, a method of soaking the PPS resin in the organic solvent, with adequately stirring or heating as needed basis. The washing temperature during washing of the PPS resin with the organic solvent is not specifically limited, but any temperature in ordinary temperature to about 300° C. may be selected. The higher washing temperature is likely to have the higher washing efficiency, but the washing temperature in ordinary temperature to 150° C. generally achieves sufficient effect. Another available method may perform the organic solvent washing under pressure in a pressure vessel at the temperature of not lower than the boiling point of the organic solvent. The washing time is also not specifically limited. The washing time depends on the washing conditions, but washing for not less than 5 minutes generally achieves sufficient effect in the case of batch washing. Continuous washing is also available.

The post-processing step may perform any of the acid treatment, the hot water treatment and the organic solvent washing. Combination of two or more of these processes is desirable in terms of removal of impurities.

According to an embodiment of the invention, the PPS may be a PPS with an alkali metal or an alkaline earth metal such as Ca introduced therein. An available method of introducing an alkali metal or an alkaline earth metal may be, for example, a method of adding an alkali metal salt or an alkaline earth metal salt before, during or after the pre-processing step described above, a method of adding an alkali metal salt or an alkaline earth metal salt in a polymerization tank before, during or after the polymerization step described above or a method of adding an alkali metal salt or an alkaline earth metal salt at the initial, middle or final stage in the above washing step. The simplest method is a method of adding an alkali metal salt or an alkaline earth metal salt after removal of the remaining oligomers or the remaining salts by organic solvent washing or warm water or hot water washing. A preferable method introduces an alkali metal or an alkaline earth metal in the form of alkali metal ion or alkaline earth metal ion such as an acetate, a hydroxide or a carbonate, into the PPS. It is also preferable to remove an excess of the alkali metal salt or the alkaline earth metal salt by, for example, warm water washing. The concentration of the alkali metal ion or the alkaline earth metal ion for introduction of the alkali metal or the alkaline earth metal described above is preferably not less than 0.001 mmol and is more preferably not less than 0.01 mmol per 1 g of the PPS. The temperature is preferably not lower than 50° C., is more preferably not lower than 75° C. and is especially preferably not lower than 90° C. The upper limit temperature is not specified but is generally not higher than 280° C. in terms of the operability. The liquor ratio (the ratio of the weight of cleaning liquid to the dry weight of PPS) is preferably not less than 0.5, is more preferably not less than 3 and is furthermore preferably not less than 5.

The PPS resin may be further subjected to high polymerization by a heat oxidation cross-linking process of heating under an oxygen atmosphere and heating with addition of a cross-linking agent such as a peroxide after completion of polymerization.

When dry heat treatment is performed for the purpose of high polymerization by heat oxidation cross-linking, the lower limit temperature is preferably not lower than 160° C. and is more preferably not lower than 170° C., and the upper limit temperature is preferably not higher than 260° C. and is more preferably not higher than 250° C. The oxygen concentration is preferably not less than 5% by volume and is more preferably not less than 8% by volume. The upper limit of the oxygen concentration is not specifically restricted but may be about 50% by volume. The lower limit of the processing time is preferably not less than 0.5 hours, is more preferably not less than 1 hour and is furthermore preferably not less than 2 hours, and the upper limit of the processing time is preferably not greater than 100 hours, is more preferably not greater than 50 hours and is furthermore preferably not greater than 25 hours. The device for heat treatment may be a general hot air drying machine, a rotary heating device or a heating device with stirring blades. It is preferable to use the rotary heating device or the heating device with stirring blades for efficient and more homogeneous treatment.

The dry heat treatment may be performed with a view to suppressing heat oxidation cross-linking and removing volatile components. The temperature of the dry heat treatment is preferably 130 to 250° C. and is more preferably in the range of 160 to 250° C. The oxygen concentration in this case is preferably less than 5% by volume and is more preferably less than 2% by volume. The lower limit of the processing time is preferably not less than 0.5 hours and is more preferably not less than 1 hour, and the upper limit of the processing time is preferably not greater than 50 hours, is more preferably not greater than 20 hours and is furthermore preferably not greater than 10 hours. The device for heat treatment may be a general hot air drying machine, a rotary heating device or a heating device with stirring blades. It is preferable to use the rotary heating device or the heating device with stirring blades for efficient and more homogeneous treatment.

(2) (b) Polyamide Resin

The polyamide resin used according to the embodiment of the invention is not specifically limited but may be any of known polyamide resins. The polyamide resin is generally a polyamide made of an amino acid, a lactam or a diamine and a dicarboxylic acid as primary structural components. Typical examples of the primary structural components include: amino acids such as 6-aminocaproic acid, 11-aminoundecanoic acid, 12-aminododecanoic acid and para-aminomethylbenzoic acid; lactams such as $\epsilon$-caprolactam and $\omega$-laurolactam; aliphatic, alicyclic and aromatic diamines such as tetramethylene diamine, pentamethylene diamine, hexamethylene diamine, octamethylene diamine, nonamethylene diamine, decamethylene diamine, undecamethylene diamine, dodecamethylene diamine, 2,2,4-/2,4,4-trimethylhexamethylene diamine, 5-methylnonamethylene diamine, meta-xylene diamine, para-xylene diamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine and 2-methylpentamethylene diamine; and aliphatic, alicyclic and aromatic dicarboxylic acids such as adipic acid, suberic acid, azelaic acid, sebacic acid, dodecanedioic acid, terephthalic acid, isophthalic acid, 2-chloroterephthalic acid, 2-methylterephthalic acid, 5-methylisophthalic acid, sodium 5-sulfoisophthalate, hexahydroterephthalic acid and hexahydroisophthalic acid. According to the embodiment of the invention, any of polyamide homopolymers and copolymers derived from these materials may be used alone or in the form of a mixture.

Typical examples of the useful polyamide resin according to the embodiment of the invention include: homopolyamide resins such as polytetramethylene sebacamide (nylon 410), polypentamethylene sebacamide (nylon 510), polycaproamide (nylon 6), polyhexamethylene adipamide (nylon 66), polyhexamethylene sebacamide (nylon 610), polyhexamethylene dodecamide (nylon 612), polydecamethylene sebacamide (nylon 1010), polydodecanamide (nylon 12), polyundecanamide (nylon 11), polyhexamethylene terephthalamide (nylon 6T), polyxylylene adipamide (nylon XD6), polynonamethylene terephthalamide (nylon 9T) and polydecamethylene terephthalamide (nylon 10T); and copolymerized polyamides (e.g., nylon 6/66, nylon 6/10 and nylons 6/66/610, 66/6T, 66/10T). Any of these polyamide resins may be used in the form of a mixture. (The symbol "/" represents copolymerization. The same shall apply hereafter.)

Among the above examples, in terms of improvement of the tracking resistance, polyamide resins having the amide group concentration of greater than 6 are preferable as the aliphatic polyamide resin, and nylon 610, nylon 612, nylon 11 and nylon 12 are especially preferable. Polyamide resins having the amide group concentration of greater than 7 are preferable as the semi-aromatic polyamide resin, and nylon 9T and nylon 10T are especially preferable. This may be attributed to that the polyamide resin having a relatively long-chain aliphatic group has relatively good heat resistance at the processing temperature of the PPS resin and suppresses formation of a tracking carbon path during a tracking resistance test due to, for example, degradation products. The "amide group concentration" herein is calculated as the number of carbon atoms per amide group in the structural formula of the polyamide resin.

In the polyamide resin according to the embodiment of the invention, the water absorption rate at 23° C. under water immersion after elapse of 24 hours is preferably not greater than 0.5% by weight and is more preferably not greater than 0.3% by weight. This is attributed to that controlling the water absorption rate of the polyamide resin added is especially preferable to enable the PPS resin composition in the water absorbing condition to maintain the excellent tracking resistance, mechanical strength, dimensional stability and moist heat stability.

The "water absorption rate" herein is a percentage value determined by soaking the polyamide resin in water at 23° C. for 24 hours in conformity with ASTM-D570 and dividing the weight difference of the polyamide resin before and after the soaking treatment by the weight of the polyamide resin before the soaking treatment.

The water absorption rate of the polyamide resin is significantly affected by amide bonds and is likely to decrease with a decrease in ratio of the amide bonds per unit volume. In order to obtain the polyamide resin having low water absorption in a preferable range according to the embodiment of the invention, the polyamide resin preferably has a long-chain alkyl group in its structural component and more specifically an alkyl group containing 8 or more carbon atoms. The presence of an aliphatic ring or an aromatic ring in the structural component of the polyamide resin is also effective to obtain the polyamide resin having the low water absorption in the preferable range according to the embodiment of the invention.

In the polyamide resin according to the embodiment of the invention, the weight loss (heating loss) after two-hour heating at 320° C. in the air is preferably not greater than 2.5% by weight, is more preferably not greater than 2.0% by weight and is furthermore preferably not greater than 1.5% by weight. The small weight loss of the resin under heating means the excellent low gas generation in the molten state and leads to suppression of the reduced productivity in the process of melt kneading and molding. The little heating loss of the polyamide resin is especially preferable, in order to enable the resulting PPS resin composition to maintain the inherent excellent heat resistance of the PPS resin. The magnitude of the heating loss may be used as the index of productivity of degradation products in the process of melt kneading or molding. In terms of suppressing deterioration of the tracking resistance caused by degradation products, the little heating loss of the polyamide resin is preferable.

The "heating loss" herein means the amount of components volatilized when the polyamide resin is heated and is calculated by the following method. The method places 10 g of polyamide resin pellets in an aluminum cup, pre-dries the pellets in an atmosphere of 130° C. for 3 hours and measures the weight of the pellets. The method subsequently treats the pellets in an atmosphere of 320° C. for 2 hours and measures the weight of the pellets again. The percentage value obtained by dividing the weight loss by the 320° C. treatment by the weight of the pellets before the 320° C. treatment is the heating loss.

In order to obtain the polyamide resin having a heating loss in a preferable range according to the embodiment of the invention, in terms of the low degradability under heating, the repetitive structure preferably has a more thermally stable component or more specifically a long-chain alkyl group or aromatic ring containing 8 or more carbon atoms.

With the recent environmental concerns, the measures against environmental loads on a global scale, for example, depletion problem of fossil fuels and increase in carbon dioxide in the air, are needed. Using a raw material derived from a plant (plant-derived component) as the raw material of the polyamide resin is irrelevant to the deletion problem of fossil fuels. Additionally, the plant grows to absorb carbon dioxide and can thus contribute to reduction of carbon dioxide. From this standpoint, the polyamide resin according to the embodiment of the invention preferably includes the plant-derived component. More specifically, the polyamide resin preferably includes any one of plant-derived 1,5-pentamethylene diamine, 1,10-decamethylene diamine, sebacic acid, dodecanedioic acid, 11-aminoundecanoic acid and 12-aminododecanoic acid, as the raw material component. Typical examples include nylon 510, nylon 610, nylon 612, nylon 1010, nylon 11 and nylon 12.

The added amount of the polyamide resin according to the embodiment of the invention is selected in the range of 5 to 50 parts by weight of the polyamide resin and is more preferably 5 to 40 parts by weight of the polyamide resin relative to 100 parts by weight of the PPS resin. The amount of the polyamide resin of greater than 50 parts by weight undesirably deteriorates the excellent properties of the PPS resin, such as low gas generation, moist heat resistance, flame resistance, dimensional stability and low water absorption. The polyamide resin of less than 5 parts by weight, on the other hand, undesirably has little effect on the tracking resistance.

The degree of polymerization of this polyamide resin is not specifically limited. The lower limit of the relative viscosity of the polyamide resin measured at 25° C. in a 98% concentrated sulfuric acid solution having the sample concentration of 0.01 g/ml is preferably not less than 1.5 and is especially preferably not less than 1.8. The upper limit of the relative viscosity of the polyamide resin is preferably not greater than 6.0 and is especially preferably not greater than 4.0. The relative viscosity of less than 1.5 undesirably deteriorates the mechanical strength. The relative viscosity of greater than 6.0, on the other hand, significantly increases the melt viscosity of the composition. This undesirably generates significant shear heat and causes degradation of a metal hydroxide and the polyamide resin when the polyamide resin is melt kneaded with the metal hydroxide and other fillers.

(3) (c) Metal Hydroxide

The metal hydroxide used according to the embodiment of the invention may be magnesium hydroxide, aluminum hydroxide or calcium hydroxide. In light of the effect of improving the tracking resistance, it is preferable to use magnesium hydroxide. The magnesium hydroxide used according to the embodiment of the invention is relatively high-purity magnesium hydroxide including not less than 80% by weight of an inorganic substance expressed by the chemical formula $Mg(OH)_2$. In terms of the tracking resistance, the mechanical strength and the melt viscosity, suitably used is high-purity magnesium hydroxide preferably including not less than 80% by weight of the inorganic substance expressed by $Mg(OH)_2$, not greater than 5% by weight of CaO content and not greater than 1% by weight of chlorine content, more preferably including not less than 95% by weight of the inorganic substance expressed by $Mg(OH)_2$, not greater than 1% by weight of CaO content and not greater than 0.5% by weight of chlorine content and furthermore preferably including not less than 98% by weight of the inorganic substance expressed by $Mg(OH)_2$, not greater than 0.1% by weight of CaO content and not greater than 0.1% by weight of chlorine content.

The magnesium hydroxide used according to the embodiment of the invention may be any form, such as granular form, flake form or fibrous form. In terms of, for example, the dispersibility, the granular form and the flake form are most preferable. The specific surface area is preferably not greater than 15 $m^2/g$ and is more preferably not greater than 10 $m^2/g$. The specific surface area of greater than 15 $m^2/g$ may affect the dispersibility of magnesium hydroxide and undesirably has adverse effects on the improvement of the tracking resistance and the mechanical strength. The "specific surface area" herein is a value measured by the BET method using nitrogen as adsorbed gas. In the case of using magnesium hydroxide in the granular form or the flake form, suitable magnesium hydroxide has the average primary particle diameter in the range of 0.3 to 5 μm or preferably in the range of 0.3 to 3 μm in terms of the good balance among the improvement of the tracking resistance, the mechanical strength and the melt viscosity. The "average primary particle diameter" is a value measured by the laser diffraction scattering method. In the case of using magnesium hydroxide in the fibrous form, suitable magnesium hydroxide has the average fiber diameter in the range of 0.1 to 2 μm and the aspect ratio in the range of 20 to 60 or preferably the average fiber diameter in the range of 0.3 to 2 μm and the aspect ratio in the range of 30 to 50. The "aspect ratio" is a ratio of the long side dimension of a substance to the short side dimension.

It is preferable to use the metal hydroxide subjected to surface treatment with any of: vinylsilane compounds such as vinyl triethoxysilane and vinyl trichlorosilane; epoxysilane compounds such as γ-glycidoxypropyltriethoxysilane and β-(3,4-epoxycyclohexyl)ethyltrimethoxysilane; aminosilane compounds such as γ-(2-aminoethyl)aminopropylmethyldimethoxysilane, γ-(2-aminoethyl)aminopropyltrimethoxysilane and γ-aminopropyltrimethoxysilane; isocyanate group-containing alkoxysilane compounds such as γ-isocyanatopropyltriethoxysilane, γ-isocyanatopropyltrimethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane and γ-isocyanatopropyltrichlorosilane; methacryloxysilane compounds such as 3-methacryloxypropylmethyldimethoxysilane, 3-methacryloxypropyltrimethoxysilane, 3-methacryloxypropylmethyldiethoxysilane and 3-methacryloxypropyltriethoxysilane; long-chain aliphatic acids and long-chain aliphatic alcohols such as stearic acid, oleic acid, montanoic acid and stearyl alcohol. It is especially preferable to use the metal hydroxide subjected to surface treatment with an epoxysilane compound, an aminosilane compound, or an isocyanatosilane compound, in terms of suppressing aggregation in the composition or in the molded product, as well as the tracking resistance and the mechanical strength.

The lower limit of the added amount of this metal hydroxide is not less than 50 parts by weight, is preferably not less than 60 parts by weight and is more preferably not less than 70 parts by weight relative to 100 parts by weight of the PPS resin. The upper limit is not greater than 250 parts by weight, is preferably not greater than 200 parts by weight and is more preferably not greater than 150 parts by weight. The added amount of less than 50 parts by weight undesirably has insufficient effect on the improvement of the tracking resistance. The added amount of greater than 250 parts by weight undesirably has significant adverse effects on the mechanical strength and the flowability of the resin composition.

(4) (d) Fibrous and/or Non-Fibrous Fillers Other than Metal Hydroxide

The PPS resin composition obtained by the method according to the embodiment of the invention may include fibrous and/or non-fibrous fillers other than the metal hydroxide in a range that does not damage the advantageous effects of the embodiment of the invention. Specific examples of such fillers include: fibrous fillers such as glass fibers, carbon fibers, carbon nanotubes, carbon nanohorns, potassium titanate whiskers, zinc oxide whiskers, calcium carbonate whiskers, wollastonite whiskers, aluminum borate whiskers, aramid fibers, alumina fibers, silicon carbide fibers, ceramic fibers, asbestos fibers, gypsum fibers and metal fibers: non-fibrous fibers including fullerene, talc, wollastonite, zeolite, sericite, mica, kaolin, clay, pyrophyllite, bentonite, asbestos, silicates such as alumina silicate, metal oxides such as silicon oxide, magnesium oxide, alumina, zirconium oxide, titanium oxide and iron oxide, carbonates such as calcium carbonate, magnesium carbonate and dolomite, sulfates such as calcium sulfate and barium sulfate, glass beads, glass flakes, glass powders, ceramic beads, boron nitride, silicon carbide, carbon black, silica and graphite. These may be hollow, and two or more of these fillers may be used in combination. Any of these fillers may be pre-treated with a coupling agent such as an isocyanate compound, an organosilane compound, an organotitanate compound, an organoboron compound or an epoxy compound.

Among them, in order to achieve the effect of improving the rigidity of the material, glass fibers and carbon fibers are preferable. In terms of the material cost, glass fibers are more preferable.

The lower limit of the added amount of the fibrous and/or non-fibrous fillers other than the metal hydroxide is not less than 0 parts by weight and is preferably not less than 20 parts by weight relative to 100 parts by weight of the PPS resin. The upper limit is not greater than 350 parts by weight and is preferably not greater than 200 parts by weight. Adding the preferable amount gives a resin composition having the better balance between the melt flowability and the mechanical strength.

(5)(e) Organosilane Compound

Adding an organosilane compound to the PPS resin composition according to the embodiment of the invention is useful for enhancing the affinity of the metal hydroxide or the fibrous and/or non-fibrous fillers other than the metal hydroxide with the PPS resin and is effective for improvement in mechanical strength.

Adding the organosilane compound is also effective for enhancing the dispersibility of the polyamide resin in the PPS resin and reducing the dispersed particle diameter of the polyamide resin. The presence of the coarse dispersed polyamide resin in the system means the presence of a locally high PPS resin composition. This may lead to reduction in tracking resistance at high voltage.

Specific examples of this organosilane compound include: epoxy group-containing alkoxysilane compounds such as γ-glycidoxypropyltrimethoxysilane, γ-glycidoxypropyltriethoxysilane and β-(3,4-epoxycyclohexyl)ethyltrimethoxysilane; mercapto group-containing alkoxysilane compounds such as γ-mercaptopropyltrimethoxysilane and γ-mercaptopropyltriethoxysilane; ureido group-containing alkoxysilane compounds such as γ-ureidopropyltriethoxysilane, γ-ureidopropyltrimethoxysilane and γ-(2-ureidoethyl)aminopropyltrimethoxysilane; isocyanate group-containing alkoxysilane compounds such as γisocyanatopropyltriethoxysilane, γ-isocyanatopropyltrimethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane and γ-isocyanatopropyltrichlorosilane; and amino group-containing alkoxysilane compounds such as γ-(2-aminoethyl)aminopropylmethyldimethoxysilane, γ-(2-aminoethyl)aminopropyltrimethoxysilane and γ-aminopropyltrimethoxysilan. The lower limit of the added amount of this organosilane compound is preferably not less than 0.1 parts by weight and is especially preferably not less than 0.2 parts by weight relative to 100 parts by weight of the PPS resin. The upper limit is preferably not greater than 5 parts by weight and is especially preferably not greater than 3 parts by weight.

(6) Other Additives

The PPS resin composition according to the embodiment of the invention may further include a resin other than the polyamide resin in a range that does not damage the advantageous effects of the embodiment of the invention. Specific examples include polybutylene terephthalate resin, polyethylene terephthalate resin, modified polyphenylene ether resin, polysulfone resin, polyarylsulfone resin, polyketone resin, polyetherimide resin, polyarylate resin, liquid crystal polymer, polyethersulfone resin, polyether ketone resin, polythioether ketone resin, polyether ether ketone resin, polyimide resin, polyamide imide resin and polytetrafluoroethylene resin.

The following compounds may be added for the purpose of modification: plasticizers such as polyalkylene oxide oligomer-based compounds, thioether-based compounds, ester-based compounds and organophosphorus-based compounds; crystal nucleating agents such a talc, kaolin, organophosphorus compounds and polyether ether ketone; montanic acid waxes; metal soaps such as lithium stearate and aluminum stearate; mold release agents such as ethylene diamine-stearic acid-sebacic acid polycondensates and silicone-based compounds; coloring inhibitors such as hypophosphites, as well as conventional additives including lubricants, ultraviolet absorbers, coloring agents and foaming agents. Any of the above compounds exceeding 20% by weight of the entire composition damages the intrinsic properties of the PPS resin and is thus undesirable. The added amount is accordingly not greater than 10% by weight and is more preferably not greater than 1% by weight.

(7) Production Method of Resin Composition

A typical method of melt kneading supplies at least the PPS resin (a), the polyamide resin (b) and the metal hydroxide (c) to a twin screw extruder and kneads the mixture at the processing temperature of the melting peak temperature of the PPS resin+5 to 100° C. Relatively high shearing force is needed for the finer dispersion of the metal hydroxide and for the finer dispersion of the PA resin. More specifically, using a twin screw extruder is essential; the presence of two or more kneading sections is preferable; and the presence of three or more kneading sections is more preferable. The upper limit of the kneading sections is preferably not greater than 10 and is more preferably not greater than 8, although depending on the balance between the length of each kneading section and the interval between kneading sections. "L/D" (L: screw length, D: screw diameter) of the twin screw extruder is preferably not less than 20 and is more preferably not less than 30. The upper limit of L/D of the twin screw extruder is generally 60. The selected lower limit of the peripheral velocity is not less than 15 m/minute and is more preferably not less than 20 m/minute, and the selected upper limit is not greater than 50 m/minute and more preferably not greater than 40 m/minute. The twin screw extruder having "L/D" of less than 20 has only an insufficient kneading part. This reduces the dispersibility of the metal hydroxide and does not satisfy the average secondary particle diameter of the metal hydroxide specified according to the embodiment of the invention, thus leading to deterioration of the mechanical strength and the tracking resistance of the PPS resin composition. The presence of less than 2 kneading sections or the peripheral velocity of less than 15 m/minute also reduces the dispersibility of the metal hydroxide with a decrease in shearing force and does not satisfy the desired physical properties. The peripheral velocity of greater than 50 m/minute, on the other hand, increases the load to the twin screw extruder and is undesirable in terms of the productivity.

According to the embodiment of the invention, for the finer dispersion of the metal hydroxide and for the finer dispersion of the PA resin, the lower limit of the ratio of the total length of the kneading sections to the whole length of the screw of the extruder is preferably not less than 10%, is more preferably not less than 15% and is furthermore preferably not less than 20%, and the upper limit is preferably not greater than 60%, is more preferably not greater than 55% and is furthermore preferably not greater than 50%. The ratio of the total length of the kneading sections to the whole length of less than 10% causes insufficient kneading and reduces the dispersibility of the metal hydroxide and the PA resin, thus deteriorating the mechanical strength and the tracking resistance of the PPS resin composition. The ratio of the total length of the kneading sections to the whole length of greater than 60%, on the other hand, generates heat by excessive shear to raise the resin temperature and leads to degradation of the metal hydroxide and the PA resin to be kneaded.

According to the embodiment of the invention, when the length of each kneading section on the screw of the extruder is "Lk" and the screw diameter is "D", in terms of the kneading performance, the lower limit of "Lk/D" is preferably not less than 0.1, is more preferably not less than 1 and is furthermore preferably not less than 2, and the upper limit is preferably not greater than 10, is more preferably not greater than 8 and is furthermore preferably not greater than 6.

According to the embodiment of the invention, when the interval between kneading sections on the screw of the extruder is "Ld" and the screw diameter is "D", in terms of suppressing excessive heat generation in the melt resin by shearing of successive kneading sections, the lower limit of "Ld/D" is preferably not less than 0.5, is more preferably not less than 1 and is furthermore preferably not less than 2, and the upper limit is preferably not greater than 10, is more preferably not greater than 8 and is furthermore preferably not greater than 6.

The selected lower limit of the resin temperature in the mixing process is the melting peak temperature of the PPS resin+5° C. or more and preferably +10° C. or more, and the selected upper limit is the melting peak temperature of the PPS resin+100° C. or less and preferably +70° C. or less. More specifically, the resin temperature in the mixing process is preferably not higher than 350° C. and is more preferably not higher than 340° C. When the kneading temperature is lower than the melting peak temperature of the PPS resin+5° C., the viscosity of the composition is significantly increased by the presence of partially unmelt PPS resin. This increases the load to the twin screw extruder and is undesirable in terms of the productivity. The kneading temperature higher than the melting peak temperature of the PPS resin+100° C., on the other hand, undesirably causes degradation of the polyamide resin and the metal hydroxide to be kneaded.

As described above, relatively high shearing force is needed for the finer dispersion of the metal hydroxide and for the finer dispersion of the polyamide resin. The high shearing force, however, simultaneously causes significant heat generation, which raises the resin temperature and leads to degradation of the polyamide resin and the metal hydroxide to be kneaded. In the process of melt kneading with the twin screw extruder, the temperature difference between the resin temperature of the polyphenylene sulfide resin composition in the discharge outlet and the cylinder temperature of the extruder is preferably not less than 0° C. but not greater than 50° C., is more preferably not less than 0° C. but not greater than 40° C. and is furthermore preferably not less than 0° C. but not greater than 30° C. The temperature difference between the resin temperature and the cylinder temperature of greater than 50° C. meas failed control of shear heat generation and, as a result, undesirably causes degradation of the polyamide resin and the metal hydroxide to be kneaded.

A method of suppressing shear heat generation in the kneading process is a method using a screw arrangement with mixing screw elements having notches for melt kneading. The "notches" herein are portions 1 shown in FIG. 1 and are formed by partly cutting peaks of the screw flight. The mixing screw elements having notches are capable of increasing the resin filling rate, and the melt resin passing through the kneading sections by linkage of the mixing screw elements having notches is likely to be affected by the cylinder temperature of the extruder. Accordingly, the mixing screw elements having notches can efficiently cool down the melt resin even heated by shear heat generation during kneading and lower the resin temperature. As a result, this suppresses degradation of the metal hydroxide and the polyamide resin by heat generation.

In terms of improving the cooling efficiency of the melt resin by resin filling and improving the kneading performance, the mixing screw element having notches preferably has the screw pitch length of 0.1D to 0.3D and 10 to 15 notches per pitch, where D represents the screw diameter. The "screw pitch length" herein means a screw length between screw peaks when the screw is rotated by 360 degrees.

The mixing order of the raw materials is not specifically limited. Available methods include: for example, a method that mixes all the raw materials and melt knead the mixture by the above method; a method that mixes part of the raw materials, melt kneads the mixture by the above method, subsequently adds the residual part of the raw materials and further melt kneads the mixture; and a method that mixes part of the raw materials and adds the residual part of the raw materials from a side feeder during melt kneading of the mixture with a single screw extruder or a twin screw extruder. In any case, in terms of preventing aggregation of the primary particles of the metal hydroxide, the PPS resin, the polyamide resin and the metal hydroxide are needed to pass through two or more kneading sections in the twin screw extruder having "L/D" of not less than 20 at the peripheral velocity set to 15 to 50 m/minute. The small amounts of additive components may be added, prior to molding to the other components kneaded by, for example, the above method and pelletized and may be subsequently molded.

(8) Polyphenylene Sulfide Resin Composition

The PPS resin composition according to the embodiment of the invention has the excellent tracking resistance, as well as the intrinsic excellent mechanical strength and low gas generation of the PPS resin. In order to achieve such properties, the average secondary particle diameter of the metal hydroxide dispersed in the PPS resin composition is preferably not greater than 5 μm, is more preferably not greater than 4 μm and is furthermore preferably not greater than 3 μm. The lower limit depends on the particle diameter of the primary particles used, but the average secondary particle diameter of the metal hydroxide in the PPS resin composition is preferably not less than 0.3 μm in light of the productivity of the primary particles. The average secondary particle diameter in the range of greater than 5 μm, on the other hand, undesirably leads to deterioration of the mechanical strength and the tracking resistance. A relatively large aggregate makes a start of a fracture point in a tensile test and in a flexural test. In terms of the tracking resistance, crude dispersion increases the coarseness and may lead to deterioration of the tracking resistance. Improvement of the dispersibility is also desired in terms of the water absorption. As the means of controlling the average secondary particle diameter of the metal hydroxide in the PPS resin composition to be not greater than 5 it is required to satisfy the conditions, i.e., "L/D" of not less than 20, the presence of two or more kneading sections and the peripheral velocity of 15 to 50 m/minute, in melt kneading of at least the PPS resin (a), the polyamide resin (b) and the metal hydroxide (c) with a twin screw extruder.

The "average secondary particle diameter" is determined as follows. An ASTM No. 1 dumbbell test piece is molded at the molding temperature of the melting peak temperature of the PPS resin+20 to 40° C. A thin piece of not greater than 0.1 μm is cut from a center portion of the dumbbell piece in its sectional area direction at room temperature. The thin piece is observed at a magnification of 1000 times with a transmission electron microscope H-7100 manufactured by Hitachi, Ltd. (resolution (particle image): 0.38 nm, magnification: 0.5 to 0.6 million times). With respect to each of arbitrary 100 particles of the metal hydroxide component in the observed thin piece, the maximum diameter and the minimum diameter are measured, and its average value is calculated as the dispersed particle diameter. The number-average dispersed particle diameter of these 100 particles of the metal hydroxide component is the "average secondary particle diameter".

In the PPS resin composition according to the embodiment of the invention, the heating loss at 320° C. for 2 hours in the air is preferably not greater than 5% by weight and is more preferably not greater than 3% by weight. The heating loss in the above range is unlikely to cause mold deposit on the surface of a mold or in a mold vent part. This prevents poor transfer and poor molding and additionally reduces the frequency of thorough cleaning of the mold, thus improving the productivity. There is no specific restriction on the lower limit of the heating loss.

The heating loss of the PPS resin composition is significantly affected by the polyamide resin used. As described above, the presence of the thermally stable component in the structural components of the polyamide resin is also effective for reduction of the heating loss of the resin composition. In order to control the heating loss of the PPS resin composition to be not greater than 5% by weight, selection of the polyamide resin used and its composition are accordingly of importance. More specifically, it is preferable to use a polyamide resin having a long-chain alkyl group or aromatic ring containing 8 or more carbon atoms. Removal of the volatile components out of the resin composition by using a vacuum pump in the melt kneading process with a twin screw extruder is also effective to reduce the heating loss of the PPS resin composition.

The "heating loss" herein means the amount of components volatilized when the PPS resin composition is heated and is calculated by the following method. The method places 10 g of resin composition pellets in an aluminum cup, predries the pellets in an atmosphere of 130° C. for 3 hours and measures the weight of the pellets. The method subsequently treats the pellets in an atmosphere of 320° C. for 2 hours and measures the weight of the pellets again. The percentage value obtained by dividing the weight loss by the 320° C. treatment by the weight of the pellets before the 320° C. treatment is the heating loss.

The PPS resin composition according to the embodiment of the invention has little heating loss under heating and is accordingly a material of the excellent moldability with improvement of the mold deposition during the melt molding process.

The range of the tensile strength (ASTM No. 1 dumbbell test piece, tension speed: 10 mm/min, 23° C., measured in conformity with ASTM-D638) as one of the physical properties representing the material strength is preferably not less than 80 MPa and is more preferably not less than 90 MPa. The range of the flexural strength (flexural test piece of 127 mm in length, 12.7 mm in width and 6.35 mm in thickness, span: 100 mm, crosshead speed: 3 mm/min, 23° C., measured in conformity with ASTM-D790) is preferably not less than 110 MPa and is more preferably not less than 125 MPa.

In the phase structure of the polyamide resin in the PPS resin composition according to the embodiment of the invention, it is preferable that the PPS resin forms a sea phase (continuous phase or matrix), and the polyamide resin forms an island phase (dispersed phase). Additionally, the number-average dispersed particle diameter of the polyamide resin is preferably less than 1000 nm, is more preferably not greater than 500 nm and is furthermore preferably not greater than 300 nm. The lower limit is preferably not less than 1 nm, in terms of the productivity. The phase structure in which the PPS resin phase forms the continuous phase and the polyamide is well dispersed therein provides the excellent tracking resistance, as well as the intrinsic excellent mechanical strength, low gas generation, heat resistance, chemical resistance and low water absorption of the PPS resin.

The "number-average dispersed particle diameter of the polyamide resin" is determined as follows. An ASTM No. 1 test piece is molded at the molding temperature of the melting peak temperature of the PPS resin+20 to 40° C. A thin piece of not greater than 0.1 μm is cut from a center portion of the dumbbell piece in its sectional area direction at −20° C. and is observed at a magnification of about 1000 to 5000 times with a transmission electron microscope. With respect to each of arbitrary 100 particles in the dispersed part of the polyamide resin, the maximum diameter and the minimum diameter are measured, and its average value is calculated. The number-average value calculated from these average values is the "number-average dispersed particle diameter of the polyamide resin".

As the tracking resistance of the PPS resin composition obtained according to the embodiment of the invention, in a tracking resistance test in conformity with IEC 60112, fourth edition, the maximum voltage at which no tracking breakdown occurs is preferably not less than 525 V, is more preferably not less than 550 V and is furthermore preferably not less than 600 V. The resistance to the higher voltage means the less limitation of the available range of the PPS resin composition and enables the PPS resin composition to be used in a wide variety of applications. In order to improve the tracking resistance of the PPS resin composition according to the embodiment of the invention, it is required to control the average secondary particle diameter of the metal hydroxide in the PPS resin composition to be not greater than 5 μm in the PPS resin composition including at least the PPS resin (a), the polyamide resin (b) and the metal hydroxide (c) in a specific composition.

(9) Applications

The PPS resin composition obtained according to the embodiment of the invention is a resin composition having the improved tracking resistance as the newly added property, which is insufficient in the conventional PPS resin, without significantly deteriorating the intrinsic properties of the PPS resin composition, i.e., the heat stability, the melt flowability, the mechanical strength, the electrical insulation property and the low water absorption. The PPS resin composition thus obtained is a resin composition that is applicable to any of various known molding methods including injection molding, extrusion molding, compression molding, blow molding and injection compression molding and is especially suitable for injection molding.

The molded product of the PPS resin composition according to the embodiment of the invention is especially suitable in applications of electric equipment components such as generators, motors, voltage transformers, current transformers, voltage regulators, rectifiers, inverters, relays, power contacts, switches, breakers, knife switches, multipole rods, electric component cabinets, light sockets, various terminal strips, plugs and power modules. The molded product is also usable in various applications including: electronic components such as sensors, LED lamps, connectors, resistors, relay cases, small switches, coil bobbins, capacitors, variable capacitor cases, optical pickups, oscillators, transformers, printed circuit boards, tuners, speakers, microphones, headphones, small motors, magnetic head bases, semiconductors, liquid crystals, FDD carriages, FDD chasses, motor brush holders, parabola antennas, and computer-related components; domestic and office electric appliance components such as VTR component, TV set components, irons, hair dryers, rice cooker components, microwave oven components, acoustic components, audio equipment components for audios, laserdiscs (registered trademark) and compact disks, lighting components, refrigerator components, air conditioner components; typewriter components and word processor components; office computer-related components, telephone-related components, facsimile-related components, copy machine-related components, cleaning jigs, motor components, and machine components for lighters and typewriters; optical equipment and precision machine components, such as microscopes, binoculars, cameras and watches; and automobile and vehicle components, such as alternator terminals, alternator connectors, IC regulators, potentiometer bases for light dimmers, various valves including emission valves, various pipes for fuel, exhaust system, and air intake system, air intake nozzle snorkels, intake manifolds, fuel pumps, engine coolant joints, carburetor main bodies, carburetor spacers, emission sensors, coolant sensors, oil temperature sensors, brake pad wear sensors, throttle position sensors, crankshaft position sensors, air flowmeters, brake pad wear sensors, thermostat bases for air conditioners, hot air flow control valves, brush holders for radiator motors, water pump impellers, turbine vanes, wiper motor components, distributors, starter switches, starter relays, transmission wire harnesses, windshield washer fluid nozzles, air conditioner panel switch plates, fuel solenoid valve coils, fuse connectors, horn terminals, electric component insulators, step motor rotors, lamp sockets, lamp reflectors, lamp housings, brake pistons, solenoid bobbins, engine oil filters and ignition case.

EXAMPLES

The following more specifically describes the embodiments of the invention with reference to Examples and Comparative Examples. The invention is, however, not limited to these Examples.

The following PPS resins (a), polyamide resins (b), metal hydroxides (c), glass fibers (d), and organosilane compounds (e) were used in Examples and Comparative Examples.

[(a) PPS Resin (a-1)]

The method fed 8.26 kg (70.00 mol) of 47.5% sodium hydrosulfide, 2.94 kg (70.63 mol) of sodium hydroxide 96%, 14.57 kg (147.00 mol) of N-methyl-2-pyrrolidone (NMP) and 3.19 kg of ion exchanged water in a 70-liter autoclave with an agitator and a bottom stop valve and gradually heated the mixture to 245° C. over about 3 hours at ordinary pressure under nitrogen stream. The method stopped heating and started cooling when 7.53 kg of water and 0.28 kg of NMP were distilled. The remaining amount of water in the system per 1 mol of the fed alkali metal hydrosulfide was 1.01 mol including the water content consumed for hydrolysis of NMP. The release amount of hydrogen sulfide was 1.40 mol, so that the amount of the sulfidizing agent remaining in the system after this step was 68.60 mol.

After cooling down to 200° C., the method added 10.34 kg (70.32 mol) of p-dichlorobenzene (p-DCB) and 5.55 kg (56.00 mol) of NMP, sealed the reaction vessel under nitrogen gas, raised the temperature from 200° C. to 276° C. at a rate of 0.6° C./minute with stirring at 240 rpm, and continued the reaction at 276° C. for 63 minutes. The method subsequently opened the extract valve on the bottom of the autoclave, flushed the content to a vessel with an agitator over 15 minutes under pressure of nitrogen and stirred the flushed content at 250° C. for some time to remove a most part of NMP.

The method placed the recovered product and 74 liters of ion exchanged water in an autoclave with an agitator, washed the recovered product at 75° C. for 15 minutes and subsequently filtered the product to obtain a cake. These washing and filtration operations were repeated four times. The method subsequently placed the cake and 74 liters of ion exchanged water in the autoclave with the agitator, replaced the inside of the autoclave with nitrogen and heated the autoclave to 195° C. The method then cooled down the autoclave, took the content out and filtered the content to obtain a cake. The method subsequently placed the obtained cake, 74 liters of ion exchanged water and 0.816 kg of acetic acid in the autoclave with the agitator, replaced the inside of the autoclave with nitrogen and heated the autoclave to 195° C. The method then cooled down the autoclave, took the content out and filtered the content to obtain a cake. The method dried the obtained cake at 120° C. under nitrogen stream to obtain a dried PPS resin (a-1). The melt viscosity measured using CAPILOGRAPH manufactured by Toyo Seiki Seisaku-sho, Ltd. was 30 Pa·s (300° C., shear rate: 1216/s). The ash content was 0.18% by weight, and the amount of volatile components was 0.6% by weight.

[(a) PPS Resin (a-2)]

A PPS resin (a-2) was obtained by performing the post-processing step according to the following method with respect to the recovered product obtained by performing the preprocessing step, the polymerization reaction step and the recovery step according to the same method as that of the PPS resin (a-1).

The method placed the recovered product obtained by performing the preprocessing step, the polymerization reaction step and the recovery step according to the same method as that of the PPS resin (a-1) and 74 liter of ion exchanged water in an autoclave with an agitator, washed the product at 75° C. for 15 minutes and subsequently filtered the product to obtain a cake. After repeating these operations four times, the method placed the obtained cake, 74 liters of ion exchanged water and 0.816 kg of acetic acid in the autoclave with the agitator, replaced the inside of the autoclave with nitrogen and heated the autoclave to 195° C. The method then cooled down the autoclave, took the content out and filtered the content to obtain a cake. The method dried the obtained cake at 120° C. under nitrogen stream to obtain a dried PPS resin (a-2). The melt viscosity was 35 Pa·s (300° C., shear rate: 1216/s). The ash content was 0.6% by weight, and the amount of volatile components was 1.4% by weight.

[(a) PPS Resin (a-3)]

The method fed 8.26 kg (70.00 mol) of 47.5% sodium hydrosulfide, 2.94 kg (70.63 mol) of sodium hydroxide 96%, 14.57 kg (147.00 mol) of N-methyl-2-pyrrolidone (NMP) and 3.19 kg of ion exchanged water in a 70-liter autoclave with an agitator and a bottom stop valve and gradually heated the mixture to 245° C. over about 3 hours at ordinary pressure under nitrogen stream. The method stopped heating and started cooling when 7.53 kg of water and 0.28 kg of NMP were distilled. The remaining amount of water in the system per 1 mol of the fed alkali metal hydrosulfide was 1.01 mol including the water content consumed for hydrolysis of NMP. The release amount of hydrogen sulfide was 1.40 mol, so that the amount of the sulfidizing agent remaining in the system after this step was 68.60 mol.

After cooling down to 200° C., the method added 10.34 kg (70.32 mol) of p-dichlorobenzene (p-DCB) and 5.55 kg (56.00 mol) of NMP, sealed the reaction vessel under nitrogen gas, raised the temperature from 200° C. to 276° C. at a rate of 0.6° C./minute with stirring at 240 rpm, and continued the reaction at 276° C. for 63 minutes. The method then pressed in 2.40 kg (133 mol) of water into the reaction vessel, while cooling down from 276° C. to 250° C. over 15 minutes. After gradually cooling down from 250° C. to 220° C. over 75 minutes, the method abruptly cooled down to about room temperature and took the content out. The method diluted the content with about 35 liters of water, stirred the resulting slurry at 85° C. for 30 minutes and then obtained a solid substance by filtration with 80 wire mesh (opening: 0.175 mm). The obtained solid substance was similarly washed with about 35 liters of NMP and filtered. The operation of diluting the obtained solid substance with 70 liters of ion exchanged water, stirring the mixture at 70° C. for 30 minutes and recovering a solid substance by filtration with 80 wire mesh was repeated a total of three times. The method diluted the obtained solid substance and 32 g of acetic acid with 70 liters of ion exchanged water, stirred the mixture at 70° C. for 30 minutes and then obtained a solid substance by filtration with 80 wire mesh. The method further diluted the obtained solid substance with 70 liters of ion exchanged water, stirred the mixture at 70° C. for 30 minutes and then obtained a solid substance by filtration with 80 wire mesh. The method dried the obtained solid substance at 120° C. under nitrogen stream to obtain a dried PPS resin (a-3). The melt viscosity was 45

Pa·s (300° C., shear rate: 1216/s). The ash content was 0.03% by weight, and the amount of volatile components was 0.4% by weight.

[(a) PPS Resin (a-4)]

The method fed 8.267 kg (70.00 mol) of 47.5% sodium hydrosulfide, 2.957 kg (70.97 mol) of sodium hydroxide 96%, 11.434 kg (115.50 mol) of N-methyl-2-pyrrolidone (NMP), 2.583 kg (31.50 mol) of sodium acetate and 10.500 kg of ion exchanged water in a 70-liter autoclave with an agitator and a bottom stop valve and gradually heated the mixture to 245° C. over about 3 hours at ordinary pressure under nitrogen stream. The method stopped heating and started cooling when 14.780 kg of water and 0.28 kg of NMP were distilled. The remaining amount of water in the system per 1 mol of the fed alkali metal hydrosulfide was 1.06 mol including the water content consumed for hydrolysis of NMP. The release amount of hydrogen sulfide was 1.30 mol, so that the amount of the sulfidizing agent remaining in the system after this step was 68.70 mol.

After cooling down to 160° C., the method added 10.235 kg (69.63 mol) of p-dichlorobenzene (p-DCB) and 9.090 kg (91.00 mol) of NMP, sealed the reaction vessel under nitrogen gas, raised the temperature from 200° C. to 238° C. at a rate of 0.6° C./minute with stirring at 240 rpm, and continued the reaction at 238° C. for 95 minutes. The method then further raised the temperature to 270° C. at a rate of 0.8° C./minute and continued the reaction at 270° C. for 100 minutes. The method subsequently pressed in 1.260 kg (70.00 mol) of water into the reaction vessel, while cooling down from 270° C. to 250° C. over 15 minutes. After gradually cooling down from 250° C. to 220° C. over 75 minutes, the method abruptly cooled down to about room temperature and took the content out. The method diluted the content with about 35 liters of water, stirred the resulting slurry at 85° C. for 30 minutes and then obtained a solid substance by filtration with 80 wire mesh (opening: 0.175 mm). The obtained solid substance was similarly washed with about 35 liters of NMP and filtered. The operation of diluting the obtained solid substance with 70 liters of ion exchanged water, stirring the mixture at 70° C. for 30 minutes and recovering a solid substance by filtration with 80 wire mesh was repeated a total of three times. The method diluted the obtained solid substance and 32 g of acetic acid with 70 liters of ion exchanged water, stirred the mixture at 70° C. for 30 minutes and then obtained a solid substance by filtration with 80 wire mesh. The method further diluted the obtained solid substance with 70 liters of ion exchanged water, stirred the mixture at 70° C. for 30 minutes and then obtained a solid substance by filtration with 80 wire mesh. The method dried the obtained solid substance at 120° C. under nitrogen stream to obtain a dried PPS resin (a-4). The melt viscosity was 200 Pa·s (300° C., shear rate: 1216/s). The ash content was 0.03% by weight, and the amount of volatile components was 0.4% by weight.

[(b) Polyamide Resins (b-1 to b-6)]

b-1: nylon 6 (CM1017 manufactured by Toray Industries, Inc.), water absorption rate: 1.8% by weight, heating loss: 3.3% by weight, amide group concentration: 6, relative viscosity: 2.7;

b-2: nylon 66 (CM3001-N manufactured by Toray Industries, Inc.), water absorption rate: 1.2% by weight, heating loss: 2.7% by weight, amide group concentration: 6, relative viscosity: 2.9;

b-3: nylon 610 (CM2001 manufactured by Toray Industries, Inc.), water absorption rate: 0.3% by weight, heating loss: 1.2% by weight, amide group concentration: 8, relative viscosity: 2.7, using plant-derived sebacic acid as the raw material;

b-4: nylon 9T (N1000A manufactured by Kuraray Co., Ltd.), water absorption rate: 0.3% by weight, heating loss: 2.0% by weight, amide group concentration: 8.5, relative viscosity: 2.6;

b-5: nylon 10T (VESTAMID HT Plus, M3000 manufactured by Daicel-Evonik, Ltd.), water absorption rate: 0.3% by weight, heating loss: 2.4% by weight, amide group concentration: 9, relative viscosity: 2.5; and b-6: nylon XD6 (S6011 manufactured by Mitsubishi Engineering-Plastics Corp.), water absorption rate: 0.3% by weight, heating loss: 3.2% by weight, amide group concentration: 7, relative viscosity: 2.8.

[(c) Metal Hydroxides (c-1 to c-3)]

c-1: surface-treated magnesium hydroxide (Kisuma 5E manufactured by Kyowa Chemical Industry Co., Ltd.), $Mg(OH)_2$ content: 99.6%, average primary particle diameter: 0.8 specific surface area: 6.0 $m^2/g$, surface treatment agent: aliphatic organic compound;

c-2: surface-treated magnesium hydroxide (Kisuma 5P manufactured by Kyowa Chemical Industry Co., Ltd.), $Mg(OH)_2$ content: 99.8%, average primary particle diameter: 0.8 μm, specific surface area: 5.6 $m^2/g$, surface treatment agent: methacryloxysilane compound; and c-3: magnesium hydroxide (Kisuma 5C manufactured by Kyowa Chemical Industry Co., Ltd.), $Mg(OH)_2$ content: 99.8%, average primary particle diameter: 1.0 μm, specific surface area: 6.2 $m^2/g$, no surface treatment.

[(d) Glass Fillers (GF: d-1)]

d-1: chopped strands (T-747 manufactured by Nippon Electric Glass Co., Ltd.), average fiber diameter: 13 μm.

[(e) Organosilane Compound (e-1 and e-2)]

e-1: β-(3,4-epoxycyclohexyl)ethyltrimethoxysilane (KBM-303 manufactured by Shin-Etsu Chemical Co., Ltd.); and e-2: γ-isocyanatopropyltriethoxysilane (KBE-9007 manufactured by Shin-Etsu Chemical Co., Ltd.)

The following evaluation and measurement methods were employed in Examples and Comparative Examples.

[Average Secondary Particle Diameter of Metal Hydroxide]

An ASTM No. 1 dumbbell test piece was molded at the molding temperature of the melting peak temperature of the PPS resin+20 to 40° C. A thin piece of not greater than 0.1 μm was cut from a center portion of the dumbbell piece in its sectional area direction at room temperature. The thin piece was observed at a magnification of 1000 times with a transmission electron microscope H-7100 manufactured by Hitachi, Ltd. (resolution (particle image): 0.38 nm, magnification: 0.5 to 0.6 million times). With respect to each of arbitrary 100 particles of the metal hydroxide component in the observed thin piece, the maximum diameter and the minimum diameter were measured, and its average value was calculated as the dispersed particle diameter. The number-average dispersed particle diameter of these 100 particles of the metal hydroxide component was calculated as the average secondary particle diameter.

[Number-Average Dispersed Particle Diameter]

A flexural test piece of 127 mm in length, 12.7 mm in width and 6.35 mm in thickness was molded at the resin temperature of 310° C. and the mold temperature of 130° C. by using an injection molding machine (SE75DUZ-C250) manufactured by Sumitomo Heavy Industries, Ltd. A center portion of this test piece was cut in a direction perpendicular to the flow direction. After a center area of the cross section was dyed, a thin piece of not greater than 0.1 μm was cut and was observed at a magnitude of 2000 times with the transmission electron microscope. With respect to each of arbitrary 100 particles of the polyamide resin in the observed thin piece, the maximum diameter and the minimum diameter were measured, and its average value was calculated as the dispersed particle diameter. The number-average dispersed particle diameter of these 100 particles of the polyamide resin was calculated as the number-average dispersed particle diameter.

[Water Absorption Rate]

The water absorption rate of the polyamide resin used was measured at 23° C. under water immersion after elapse of 24 hours, in conformity with ASTM-D570.

[Heating Loss]

The procedure placed 10 g of pellets of the polyamide resin used or the PPS resin composition in an aluminum cup, pre-dried the pellets in an atmosphere of 130° C. for 3 hours and measured the weight of the pellets. The procedure subsequently treated the pellets in an atmosphere of 320° C. for 2 hours and measured the weight of the pellets again. The percentage value obtained by dividing the weight loss by the 320° C. treatment by the weight of the pellets before the 320° C. treatment is the heating loss. The resin composition having the less heating loss has the better low gas generation and the better molding processability.

[Tensile Strength]

An ASTM No. 1 dumbbell test piece was molded at the resin temperature of 310° C. and the mold temperature of 130° C. by using the injection molding machine (SE75DUZ-C250) manufactured by Sumitomo Heavy Industries, Ltd. With respect to the molded test piece, the tensile strength was measured in conformity with ASTM D638 under the conditions of the span of 114 mm, the tension speed of 10 mm/min and the temperature of 23° C.×relative humidity of 50%.

[Relative Viscosity]

The relative viscosity was measured in 98% sulfuric acid at the concentration of 0.01 g/ml using an Ostwald viscometer at 25° C.

[Flexural Strength]

A flexural test piece of 127 mm in length, 12.7 mm in width and 6.35 mm in thickness was molded at the resin temperature of 310° C. and the mold temperature of 130° C. by using the injection molding machine (SE75DUZ-C250) manufactured by Sumitomo Heavy Industries, Ltd. With respect to this molded test piece, the flexural strength was measured in conformity with ASTM D790 under the conditions of the span of 100 mm, the crosshead speed of 3 mm/min and the temperature of 23° C.×relative humidity of 50%.

[Tracking Resistance]

With respect to a square plate (80 mm×80 mm×3.0 mm in thickness) molded at the resin temperature of 320° C. and the mold temperature of 130° C. by using the injection molding machine (SE75DUZ-C250) manufactured by Sumitomo Heavy Industries, Ltd, the maximum voltage at which no tracking breakdown occurred was measured in conformity with IEC 60112, the fourth edition. An electrolytic solution used was a 0.1% ammonium chloride aqueous solution.

[Ash Content]

The procedure weighed 5 g of PPS base powder in the dry state in a crucible and fired the PPS resin to obtain black bulk substance on an electric heater. The procedure subsequently continued firing the substance in an electric oven set to 550° C. until the carbide was burned out. The procedure then cooled down the substance in a desiccator, measured the weight and calculated the ash content based on comparison from the initial weight.

[Amount of Volatile Components]

In a glass vial including a body portion of 100 mm×25 mm and a neck portion of 255 mm×12 mm and having the wall thickness of 1 mm, 3 g of a sample was weighed and vacuum sealed. Only the body portion of the glass vial was inserted into a ceramic electric tube furnace ARF-30K manufactured by Asahi Rika Co., Ltd. and was heated at 320° C. for 2 hours. After the vial was taken out of the tube furnace, the neck portion of the vial which the volatile components adhered to and which was not heated in the tube furnace was cut off with a file and weighed. After the adhesive gas was dissolved in 5 g of chloroform for removal, the neck portion was dried in a glass dryer at 60° C. for 1 hour and was weighed again. The weight difference of the neck portion of the vial before and after removal of the volatile components was calculated as the amount of volatile components (% by weight relative to the polymer).

Example 1

The procedure dry blended 100 parts by weight of the PPS resin (a-1), 20 parts by weight of the polyamide resin (b-1), 105 parts by weight of the magnesium hydroxide (c-1) and 2.5 parts by weight of the organosilane compound (e-1) and placed the mixture into a twin screw extruder model TEX30α manufactured by the Japan Steel Works, Ltd. (L/D=30, three kneading sections, with mixing screw elements having notches), while fed 120 parts by weight of the glass fibers (d-1) from a side feeder of the twin screw extruder. The conditions of melt kneading were the temperature of 320° C. and the peripheral velocity of 28 m/minute. This kneading method is specified as method A (Table 1). The temperature of the melt resin discharged from the extruder was 335° C. The melt resin was cut into pellets with a strand cutter. The pellets were dried with hot air at 120° C. for 8 hours and were subjected to injection molding. Evaluation results of the average secondary particle diameter of the metal hydroxide, the number-average dispersed particle diameter of the PA resin, the tensile strength, the flexural strength, the heating loss and the tracking resistance are shown in Table 1.

Examples 2 to 5, 8, 9 and 11 to 17

PPS resin compositions were produced by the same procedure as that of Example 1, except that the PPS resins (a-1) to (a-3), the polyamide resins (b-1) to (b-6), the magnesium hydroxides (c-1) to (c-3), the glass fibers (d-1) and the organosilane compounds (e-1) and (e-2) were mixed in the compositions shown in Tables 1 and 2, and their physical properties were evaluated by the same method as that of Example 1. Evaluation results are shown in Tables 1 and 2.

Example 6

The procedure dry blended 100 parts by weight of the PPS resin (a-1), 20 parts by weight of the polyamide resin (b-3), 105 parts by weight of the magnesium hydroxide (c-1) and 2.5 parts by weight of the organosilane compound (e-1) and placed the mixture into a twin screw extruder model TEX30α manufactured by the Japan Steel Works, Ltd. (L/D=30, two kneading sections, without mixing screw elements having notches), while fed 120 parts by weight of the glass fibers (d-1) from a side feeder of the twin screw extruder. The conditions of melt kneading were the temperature of 320° C. and the peripheral velocity of 19 m/minute. This kneading method is specified as method B (Table 1). The melt resin was cut into pellets with a strand cutter. The pellets were dried with hot air at 120° C. for 8 hours and were subjected to injection molding. Evaluation results are shown in Table 1.

Example 7

The procedure dry blended 100 parts by weight of the PPS resin (a-1), 20 parts by weight of the polyamide resin (b-3), 105 parts by weight of the magnesium hydroxide (c-1) and 2.5 parts by weight of the organosilane compound (e-1) and placed the mixture into a twin screw extruder model TEX30α manufactured by the Japan Steel Works, Ltd. (L/D=30, three kneading sections, without mixing screw elements having notches), while fed 120 parts by weight of the glass fibers (d-1) from a side feeder of the twin screw extruder. The conditions of melt kneading were the temperature of 320° C. and the peripheral velocity of 19 m/minute. This kneading method is specified as method C (Table 1). The melt resin was cut into pellets with a strand cutter. The pellets were dried with hot air at 120° C. for 8 hours and were subjected to injection molding. Evaluation results are shown in Table 1.

Example 10

A PPS resin composition was produced by the same method as that of Example 7, except that the PPS resin (a-4), the polyamide resin (b-3), the magnesium hydroxide (c-1), the glass fibers (d-1) and the organosilane compound (e-1) were mixed in the composition shown in Table 1, and its physical properties were evaluated similarly. Evaluation results are shown in Table 1.

Comparative Example 1

The procedure dry blended 100 parts by weight of the PPS resin (a-1), 20 parts by weight of the polyamide resin (b-2), 105 parts by weight of the magnesium hydroxide (c-1) and 2.5 parts by weight of the organosilane compound (e-1) and placed the mixture into a twin screw extruder model TEX30α manufactured by the Japan Steel Works, Ltd. (L/D=30, no kneading section, without mixing screw elements having notches), while fed 120 parts by weight of the glass fibers (d-1) from a side feeder of the twin screw extruder. The conditions of melt kneading were the temperature of 320° C. and the peripheral velocity of 9 m/minute. This kneading method is specified as method D in Table 2. The melt resin was cut into pellets with a strand cutter. The pellets were dried with hot air at 120° C. for 8 hours and were subjected to injection molding. Evaluation results of the average secondary particle diameter of the metal hydroxide, the number-average dispersed particle diameter of the PA resin, the tensile strength, the flexural strength, the heating loss and the tracking resistance are shown in Table 2.

Comparative Example 2

A PPS resin composition was produced by the same method as that of Comparative Example 1, except that the PPS resin (a-1), the polyamide resin (b-3), the magnesium hydroxide (c-1), the glass fibers (d-1) and the organosilane compound (e-1) were mixed in the composition shown in Table 2, and its physical properties were evaluated by the same method as that of Comparative Example 1. Evaluation results are shown in Table 2.

Comparative Examples 1 and 2 employed the screw with no kneading section and set the peripheral velocity to 9 m/minute for melt kneading. Irrespective of the same compositions as those of Examples 2 and 3, Comparative Examples 1 and 2 had the greater average secondary particle diameters of the metal hydroxide and had poorer mechanical strengths and tracking resistances.

Comparative Examples 3 to 5

PPS resin compositions were produced by the same method as that of Example 1, except that the PPS resin (a-1), the polyamide resin (b-3), the magnesium hydroxide (c-1), the glass fibers (d-1) and the organosilane compound (e-1) were mixed in the composition shown in Table 2, and their physical properties were evaluated by the same method as that of Example 1. Evaluation results are shown in Table 2.

Comparative Example 3 did not use the polyamide resin and accordingly had the lower tracking resistance, while having the lower heating loss, compared with Example 1.

Comparative Example 4 increased the composition ratio of the polyamide resin to the PPS resin, compared with that of Example 3. This, however, increased the heating loss and had poor moldability and reduction of the mechanical strength.

Comparative Example 5 decreased the composition ratio of the magnesium hydroxide to the PPS resin, compared with that of Example 3. This improved the mechanical strength and reduced the heating loss, however, significantly lowered the tracking resistance.

Comparative Example 6

Production of a PPS resin composition was tried by the same method as that of Example 1, except that the PPS resin (a-1), the polyamide resin (b-3), the magnesium hydroxide (c-1), the glass fibers (d-1) and the organosilane compound (e-1) were mixed in the composition shown in Table 2. This composition, however, had a large amount of the filler component could not be kneaded.

TABLE 1

|  |  |  |  | EX 1 | EX 2 | EX 3 | EX 4 | EX 5 | EX 6 | EX 7 | EX 8 | EX 9 | EX 10 |
|---|---|---|---|---|---|---|---|---|---|---|---|---|---|
| k1* | (a) | a-1 | parts by weight | 100 | 100 | 100 | 100 | 100 | 100 | 100 |  |  |  |
|  |  | a-2 | parts by weight |  |  |  |  |  |  |  | 100 |  |  |
|  |  | a-3 | parts by weight |  |  |  |  |  |  |  |  | 100 |  |
|  |  | a-4 | parts by weight |  |  |  |  |  |  |  |  |  | 100 |
|  | (b) | b-1 | parts by weight | 20 |  |  |  |  |  |  |  |  |  |
|  |  | b-2 | parts by weight |  | 20 |  |  |  |  |  |  |  |  |
|  |  | b-3 | parts by weight |  |  | 20 | 50 | 20 | 20 | 20 | 20 | 20 | 20 |
|  |  | b-4 | parts by weight |  |  |  |  |  |  |  |  |  |  |
|  |  | b-5 | parts by weight |  |  |  |  |  |  |  |  |  |  |
|  |  | b-6 | parts by weight |  |  |  |  |  |  |  |  |  |  |
|  | (c) | c-1 | parts by weight | 105 | 105 | 105 | 105 | 50 | 105 | 105 | 105 | 105 | 105 |
|  |  | c-2 | parts by weight |  |  |  |  |  |  |  |  |  |  |
|  |  | c-3 | parts by weight |  |  |  |  |  |  |  |  |  |  |
|  | (d) | d-1 | parts by weight | 120 | 120 | 120 | 120 | 120 | 120 | 120 | 120 | 120 | 120 |
|  | (e) | e-1 | parts by weight | 2.5 | 2.5 | 2.5 | 2.5 | 2.5 | 2.5 | 2.5 | 2.5 | 2.5 | 2.5 |
|  |  | e-2 | parts by weight |  |  |  |  |  |  |  |  |  |  |
| k2* |  |  |  | A | A | A | A | A | B | C | A | A | C |
| k3* |  |  | ° C. | 335 | 335 | 335 | 335 | 335 | 350 | 350 | 335 | 335 | 365 |

TABLE 1-continued

|   |   |   | EX 1 | EX 2 | EX 3 | EX 4 | EX 5 | EX 6 | EX 7 | EX 8 | EX 9 | EX 10 |
|---|---|---|---|---|---|---|---|---|---|---|---|---|
| k4* |  | μm | 1.5 | 1.5 | 1.5 | 1.5 | 1.2 | 4.0 | 2.5 | 1.5 | 1.1 | 5.0 |
| k5* |  | μm | 0.3 | 0.3 | 0.3 | 0.3 | 0.3 | 0.8 | 0.6 | 0.6 | 0.3 | 0.3 |
| k6* | k7* | MPa | 97 | 97 | 95 | 83 | 103 | 85 | 90 | 85 | 106 | 80 |
|  | k8* | MPa | 131 | 126 | 133 | 112 | 138 | 113 | 130 | 111 | 140 | 111 |
|  | k9* | % by weight | 3.8 | 3.5 | 2.6 | 3.5 | 2.4 | 2.6 | 2.6 | 3.2 | 2.3 | 3.0 |
|  | k10* | V | 550 | 550 | 600 | 600 | 525 | 550 | 575 | 525 | 600 | 525 |

(a): PPS
(b): PA
(c): Mg(OH)$_2$
(d): GF
(e): Silane compound
k1*: Composition
k2*: Kneading method
k3*: Resin temperature
k4*: Average secondary particle diameter of metal hydroxide
k5*: Number-average dispersed particle diameter of PA resin
k6*: Physical property
k7*: Tensile strength
k8*: Flexural strength
k9*: Heating loss
k10*: Tracking resistance

TABLE 2

|   |   |   |   | EX 11 | EX 12 | EX 13 | EX 14 | EX 15 | EX 16 | EX 17 | COMP EX 1 | COMP EX 2 | COMP EX 3 | COMP EX 4 | COMP EX 5 | COMP EX 6 |
|---|---|---|---|---|---|---|---|---|---|---|---|---|---|---|---|---|
| k1* | (a) | a-1 | parts by weight | 100 | 100 | 100 | 100 | 100 | 100 | 100 | 100 | 100 | 100 | 100 | 100 | 100 |
|  |  | a-2 | parts by weight |  |  |  |  |  |  |  |  |  |  |  |  |  |
|  |  | a-3 | parts by weight |  |  |  |  |  |  |  |  |  |  |  |  |  |
|  |  | a-4 | parts by weight |  |  |  |  |  |  |  |  |  |  |  |  |  |
|  | (b) | b-1 | parts by weight |  |  |  |  |  |  |  |  |  |  |  |  |  |
|  |  | b-2 | parts by weight |  |  |  |  |  |  |  | 20 |  |  |  |  |  |
|  |  | b-3 | parts by weight | 20 | 20 | 20 | 20 |  |  |  |  | 20 |  | 65 | 20 | 20 |
|  |  | b-4 | parts by weight |  |  |  |  | 20 |  |  |  |  |  |  |  |  |
|  |  | b-5 | parts by weight |  |  |  |  |  | 20 |  |  |  |  |  |  |  |
|  |  | b-6 | parts by weight |  |  |  |  |  |  | 20 |  |  |  |  |  |  |
|  | (c) | c-1 | parts by weight | 105 | 105 |  |  | 105 | 105 | 105 | 105 | 105 | 105 | 105 | 30 | 275 |
|  |  | c-2 | parts by weight |  |  | 105 |  |  |  |  |  |  |  |  |  |  |
|  |  | c-3 | parts by weight |  |  |  | 105 |  |  |  |  |  |  |  |  |  |
|  | (d) | d-1 | parts by weight | 120 | 120 | 120 | 120 | 120 | 120 | 120 | 120 | 120 | 120 | 120 | 120 | 120 |
|  | (e) | e-1 | parts by weight |  |  | 2.5 | 2.5 | 2.5 | 2.5 | 2.5 | 2.5 | 2.5 | 2.5 | 2.5 | 2.5 | 2.5 |
|  |  | e-2 | parts by weight |  | 2.5 |  |  |  |  |  |  |  |  |  |  |  |
| k2* |  |  |  | A | A | A | A | A | A | A | D | D | A | A | A | A |
| k3* |  |  | °C. | 335 | 335 | 335 | 335 | 335 | 335 | 335 | 345 | 345 | 345 | 335 | 335 | — |
| k4* |  |  | μm | 1.7 | 1.2 | 1.4 | 3.8 | 1.5 | 1.5 | 1.5 | 10.5 | 9.8 | 2.0 | 2.0 | 1.4 | — |
| k5* |  |  | μm | 0.5 | 0.2 | 0.2 | 0.4 | 0.3 | 0.3 | 0.3 | 1.3 | 1.3 | — | 3.5 | 1.0 | — |
| k6* | k7* |  | MPa | 83 | 105 | 110 | 80 | 93 | 91 | 82 | 75 | 73 | 95 | 75 | 105 | — |
|  | k8* |  | MPa | 111 | 141 | 145 | 110 | 133 | 128 | 115 | 100 | 97 | 130 | 104 | 140 | — |
|  | k9* |  | % by weight | 2.5 | 2.6 | 2.6 | 2.5 | 2.1 | 2.1 | 4.2 | 3.3 | 3.6 | 2.0 | 8.0 | 2.2 | — |
|  | k10* |  | V | 575 | 600 | 600 | 525 | 600 | 600 | 525 | 475 | 475 | 500 | 600 | 425 | — |

(a): PPS
(b): PA
(c): Mg(OH)$_2$
(d): GF
(e): Silane compound
k1*: Composition
k2*: Kneading method
k3*: Resin temperature
k4*: Average secondary particle diameter of metal hydroxide
k5*: Number-average dispersed particle diameter of PA resin
k6*: Physical property
k7*: Tensile strength
k8*: Flexural strength
k9*: Heating loss
k10*: Tracking resistance The PPS resin composition is a resin composition that is applicable to any of various known molding methods including injection molding, extrusion molding, compression molding, blow molding and injection compression molding and is especially suitable for injection molding. The molded product of the PPS resin composition according to the invention is especially suitable in applications of electric equipment components such as generators, motors, voltage transformers, current transformers, voltage regulators, rectifiers, inverters, relays, power contacts, switches, breakers, knife switches, multipole rods, electric component cabinets, light sockets, various terminal strips, plugs and power modules.

DESCRIPTION OF SYMBOLS

1 Notch
2 Screw pitch
3 Screw diameter D

The invention claimed is:

1. A polyphenylene sulfide resin composition, comprising: 5 to 50 parts by weight of a polyamide resin (b) and 50 to 250 parts by weight of a metal hydroxide (c) relative to 100 parts by weight of a polyphenylene sulfide resin (a), wherein
the metal hydroxide is dispersed in the composition at an average secondary particle diameter equal to or less than 5 μm; wherein the polyphenylene sulfide resin composition is prepared by melt kneading the composition at a peripheral rate of 15 to 50 m/minute with a twin screw extruder having a screw arrangement including two or more kneading sections.

2. The polyphenylene sulfide resin composition according to claim 1, wherein
the polyamide resin is dispersed in the composition at a number-average dispersed particle diameter less than 1 μm.

3. The polyphenylene sulfide resin composition according to claim 1, wherein
the polyamide resin has a water absorption rate equal to or less than 0.5% by weight at 23° C. under water immersion after elapse of 24 hours and has a heating loss equal to or less than 2.5% by weight at 320° C. in the air for 2 hours.

4. The polyphenylene sulfide resin composition according to claim 1, wherein
the polyamide resin includes a plant-derived component.

5. The polyphenylene sulfide resin composition according to claim 1, wherein
the polyamide resin is an aliphatic polyamide resin having an amide group concentration greater than 6.

6. The polyphenylene sulfide resin composition according to claim 5, wherein
the polyamide resin is one or more polyamide resins selected from the group consisting of nylon 610, nylon 612, nylon 11 and nylon 12.

7. The polyphenylene sulfide resin composition according to claim 1, wherein
the polyamide resin is a semi-aromatic polyamide resin having an amide group concentration greater than 7.

8. The polyphenylene sulfide resin composition according to claim 7, wherein
the polyamide resin is one or more polyamide resins selected from the group consisting of nylon 9T and nylon 10T.

9. The polyphenylene sulfide resin composition according to claim 1, wherein
the polyphenylene sulfide resin has an ash content equal to or less than 0.3% by weight and an amount of volatile component equal to or less than 0.8% by weight when the polyphenylene sulfide resin is heated and melted at 320° C. under vacuum for 120 minutes.

10. The polyphenylene sulfide resin composition according to claim 1, wherein
the metal hydroxide is the metal hydroxide surface treated with either an aliphatic organic compound or an organosilane compound.

11. The polyphenylene sulfide resin composition according to claim 1, wherein
in the melt kneading, a resin temperature of the polyphenylene sulfide resin composition at a discharge outlet is equal to or lower than 350° C., and
a temperature difference between the resin temperature and a cylinder temperature of the twin screw extruder is 0° C. to 50° C.

12. The polyphenylene sulfide resin composition according to claim 1, wherein
the melt kneading uses a screw arrangement including a mixing screw element having notches.

13. A molded product obtained by injection molding the polyphenylene sulfide resin composition according to claim 1.

14. The molded product according to claim 13, the molded product being an electric equipment component.

* * * * *